US008542741B2

(12) United States Patent
Yokoyama

(10) Patent No.: US 8,542,741 B2
(45) Date of Patent: Sep. 24, 2013

(54) IMAGE PROCESSING DEVICE AND IMAGE PROCESSING METHOD

(75) Inventor: Masayuki Yokoyama, Tokyo (JP)

(73) Assignee: Sony Corporation, Tokyo (JP)

( * ) Notice: Subject to any disclaimer, the term of this patent is extended or adjusted under 35 U.S.C. 154(b) by 556 days.

(21) Appl. No.: 12/793,791

(22) Filed: Jun. 4, 2010

(65) Prior Publication Data

US 2010/0316127 A1 Dec. 16, 2010

(30) Foreign Application Priority Data

Jun. 12, 2009 (JP) ................................ P2009-140813

(51) Int. Cl.
*H04N 7/12* (2006.01)
*H04N 11/12* (2006.01)
*H04N 11/04* (2006.01)

(52) U.S. Cl.
USPC ............. 375/240.16; 375/240.11; 375/240.15

(58) Field of Classification Search
USPC .................................................... 375/240.16
See application file for complete search history.

(56) References Cited

U.S. PATENT DOCUMENTS

| 4,661,849 | A | * | 4/1987 | Hinman | 375/240.16 |
| 5,729,691 | A | * | 3/1998 | Agarwal | 709/247 |
| 5,801,778 | A | * | 9/1998 | Ju | 375/240.15 |
| 6,005,621 | A | * | 12/1999 | Linzer et al. | 375/240.11 |
| 7,545,957 | B2 | * | 6/2009 | Cornog et al. | 382/107 |

FOREIGN PATENT DOCUMENTS

| JP | 8-46968 | 2/1996 |
| JP | 8-265772 | 10/1996 |
| JP | 2001-298745 | 10/2001 |
| JP | 2004 56305 | 2/2004 |
| JP | 2004-229150 | 8/2004 |
| JP | 2008-141616 | 6/2008 |
| JP | 2009 55410 | 3/2009 |
| JP | 2009-104284 | 5/2009 |

* cited by examiner

*Primary Examiner* — Christopher S Kelley
*Assistant Examiner* — Hee-Yong Kim
(74) *Attorney, Agent, or Firm* — Frommer Lawrence & Haug LLP; William S. Frommer

(57) ABSTRACT

An image processing device for detecting a motion between two different screens, includes: a high resolution template frame buffer; a high resolution reference frame buffer; a low resolution template frame buffer; a low resolution reference frame buffer; a low resolution motion vector calculation section; a high resolution motion vector calculation section; and a high resolution layer calculation determination section.

12 Claims, 26 Drawing Sheets

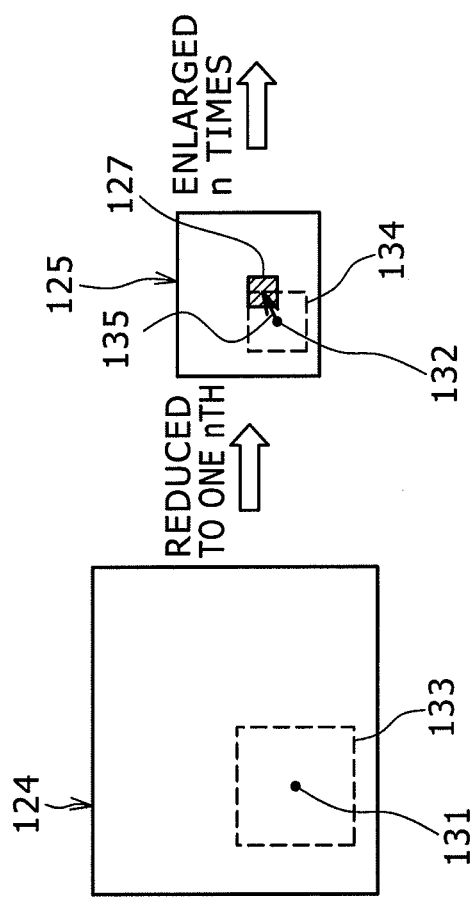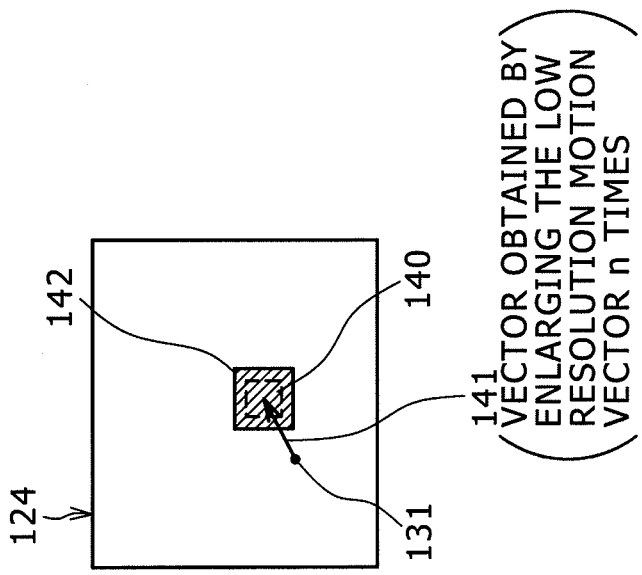

F I G . 6
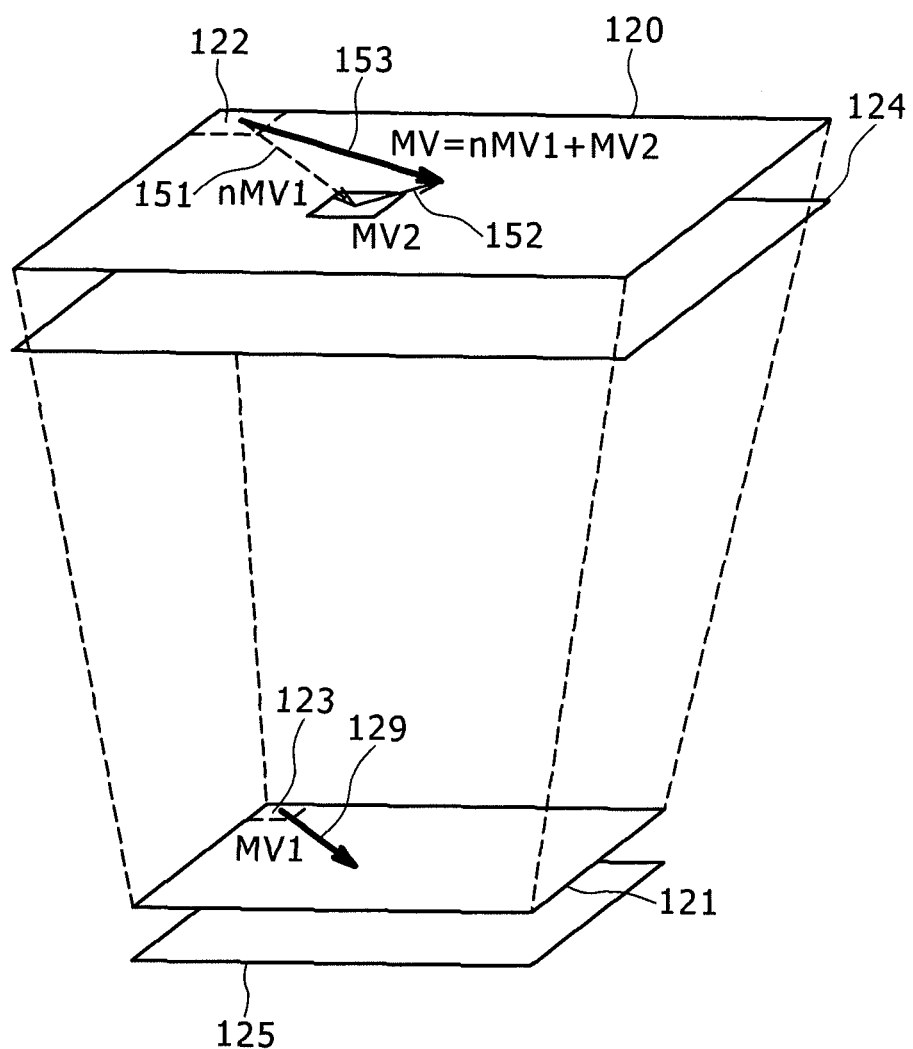

FIG.7

$$SAD = \sum_{i=0, j=0}^{M,N} |Ic(i,j) - Ir(i,j)| \quad \cdots (1)$$

Ic(i,j): BRIGHTNESS OF THE PIXEL (i,j)
IN THE TEMPLATE BLOCK

Ir(i,j): BRIGHTNESS OF THE PIXEL (i,j)
IN THE REFERENCE BLOCK i: HORIZONTAL PIXEL POSITION IN THE
TEMPLATE AND REFERENCE BLOCKS AND i=0 TO M j: VERTICAL PIXEL POSITION IN THE
TEMPLATE AND REFERENCE BLOCKS AND j=0 TO N

---

$$|V(x,y)| = \sqrt{x^2 + y^2} \quad \cdots (2)$$

$$|V(x,y)| = |x| + |y| \quad \cdots (3)$$

---

$$E(x,y) = \left| \sum_{i=0, j=0}^{M,N} \alpha(x-i, y-j) I(x,y) \right| \quad \cdots (4)$$

---

$$\alpha = \begin{pmatrix} -1 & -1 & -1 \\ -1 & 8 & -1 \\ -1 & -1 & -1 \end{pmatrix} \quad \cdots (5)$$

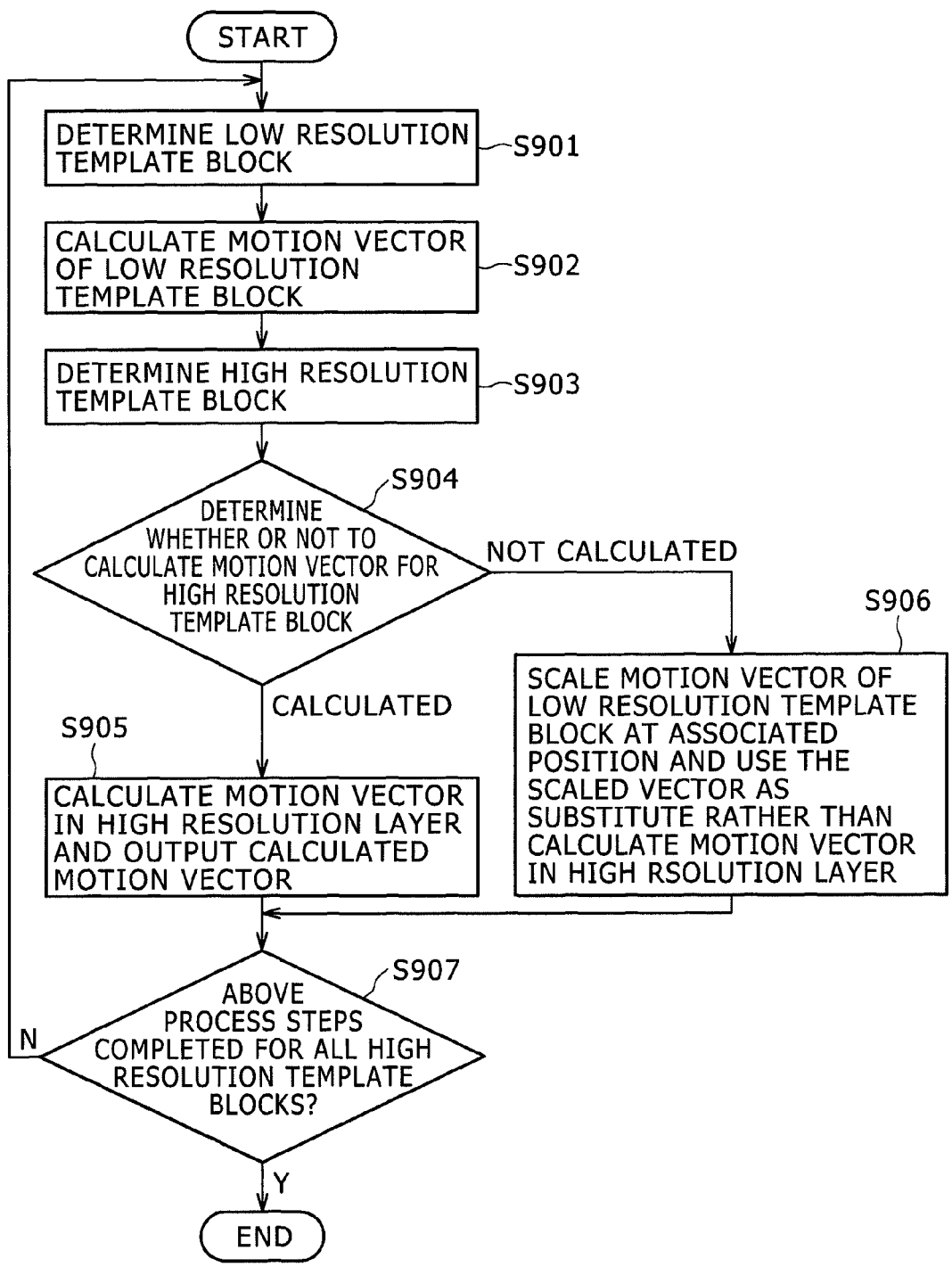

FIG.27A  FIG.27B
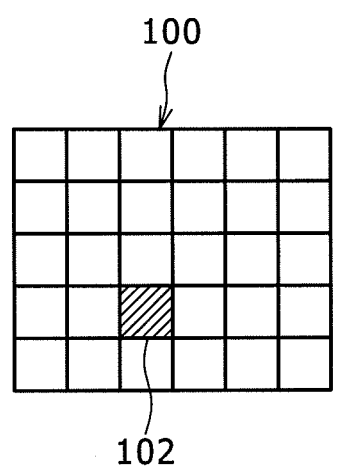
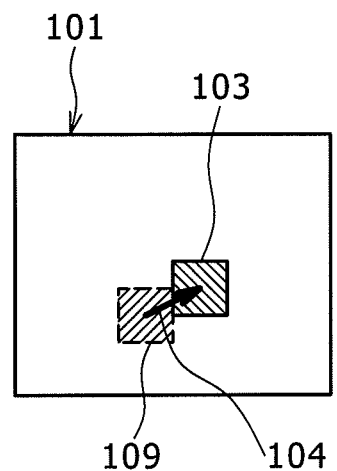
FIG.28
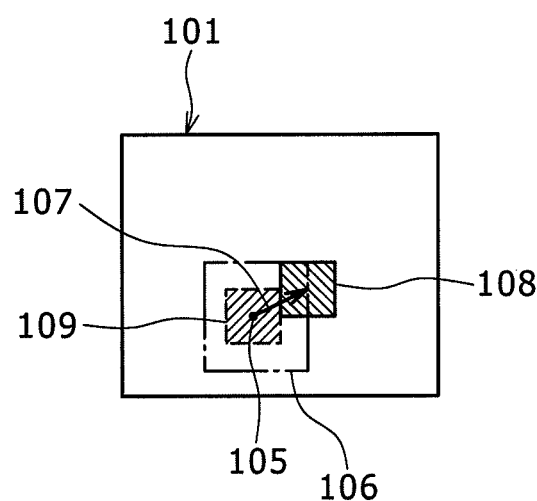

IMAGE PROCESSING DEVICE AND IMAGE PROCESSING METHOD

BACKGROUND OF THE INVENTION

1. Field of the Invention

The present invention relates to an image processing device and an image processing method for detecting a motion (motion vector) between two different screens. In the present specification, the term "screen" refers to an image made up of a field or frame of image data which appears on the display as a single image.

2. Description of the Related Art

A variety of image processing operations can be performed by detecting a motion (motion vector) between two different screens and using the detected motion vector.

For example, it is widely known that moving image data can be compressed with high efficiency during handling of such data if a motion vector between two screens in the data is used. It is also known that a detected motion vector is used to detect panning and tilting of the television camera and track the subject.

Further, recent years have witnessed rapidly growing use of a motion vector in diverse applications, sensorless handshake correction and removing noise during filming under low illumination by superposing images using a detected motion vector.

The block matching method and gradient method are examples of known motion vector calculation methods. The block matching method is commonly used.

The block matching method calculates a motion vector between two screens, a reference screen of interest and a template screen which is the source of motion in the reference screen, by calculating the degree of correlation between the reference and template screens on a block-by-block basis, with one block being a rectangular area of a predetermined size.

That is, the block matching method finds the degree of correlation between the template block set in the template screen and a plurality of reference blocks set in the search area of the reference screen for each of the reference blocks. The degree of correlation represents how well the two blocks are correlated with each other. The motion vector is calculated relative to the template block based on the reference block having the highest of all the degrees of correlation found.

It should be noted that there are two cases, one in which the template screen is antecedent to the reference screen (e.g., motion detection in MPEG), and another in which the reference screen is antecedent to the template screen (e.g., noise reduction by superposing image frames).

As described earlier, the term "screen" refers to an image made up of a field or frame of image in the present specification. For convenience of the following description in the present specification, we assume that a screen is made up of a frame. As a result, a screen is referred to as a frame. Therefore, a reference screen is referred to as a reference frame, and a template screen as a template frame.

An existing common block matching method will be outlined below with reference to FIGS. 27A to 30.

The block matching method described here divides, for example, a template frame 100 into a plurality of rectangular areas (referred to as blocks), each of which is of a predetermined size and made up of a plurality of horizontal pixels and a plurality of vertical lines, as illustrated in FIG. 27A. Each of the plurality of blocks 102 in the template frame 100 is referred to as a template block.

The block matching searches for a block highly correlated to the template block 102 from among those in a reference frame 101. The blocks, set in the reference frame 101, which are of equal size to the template block 102 are referred to as reference blocks.

A reference block 103 (refer to FIG. 27B) detected to have the highest degree of correlation in the reference frame 101 as a result of the search is referred to as a motion compensation block. On the other hand, the displacement (including magnitude and direction of displacement) between the template block 102 and motion compensation block 103 is referred to as a motion vector (refer to reference numeral 104 in FIG. 27B).

When a projection image block 109 of each of the template blocks 102 is assumed to be at the same position in the reference frame 101 as that template block 102 of the template frame 100, the motion vector 104 corresponds to the displacement between the position (e.g., center) of the projection image block 109 of this template block and the position (e.g., center) of the motion compensation block 103. The motion vector 104 also contains magnitude and direction components of displacement.

The block matching process will be outlined below. As illustrated by a dashed line in FIG. 28, the projection image block 109 of each of the template blocks 102 is assumed to be at the same position in the reference frame 101 as that template block 102 of the template frame 100. The coordinates of the center of the projection image block 109 of this template block are set as a motion detection origin 105. Assuming that the motion vector 104 exists within a given area from the motion detection origin 105, a predetermined area centered at the motion detection origin 105 is set as a search area 106 (refer to a long-dashed short dashed line in FIG. 27B).

Next, a block (reference block) 108 of equal size to the template block 102 is set in the reference frame. Then, the reference block 108 is moved, for example, horizontally or vertically, by one or a plurality of pixels at a time in the search area 106. Therefore, the plurality of reference blocks 108 are set in the search area 106.

Here, moving the reference block 108 in the search area 106 means moving the center of the reference block 108 in the search area 106 because the motion detection origin 105 is the center of the reference block. Therefore, the pixels making up the reference block 108 may be pushed off the search area 106.

Next, a vector (referred to as a reference vector) 107 (refer to FIG. 27B) is set in the search area for each of the reference blocks 108. The reference vector 107 represents the magnitude and direction of displacement between the reference block 108 of interest and the template block 102. Then, the correlation is evaluated between the image content of the reference block 108 at the position indicated by one of the reference vectors 107 and that of the template block 102.

The reference vector 107 can be expressed as a vector (Vx, Vy) as illustrated in FIG. 29 when the horizontal displacement (in the X direction) of the reference block 108 is Vx and the vertical displacement (in the Y direction) thereof. Vy.

If, for example, the reference block 108 is displaced by one pixel in the X direction from the template block 102, the reference vector 107 is a vector (1,0). On the other hand, if the reference block 108 is displaced by three pixels in the X direction and two pixels in the Y direction from the template block 102 as illustrated in FIG. 30, the reference vector 107 is a vector (3,2).

That is, the reference vector 107 represents the displacement between the center of the associated reference block 108 and that of the template block 102 when the positions of the reference block 108 and template block 102 are assumed to be the centers of the respective blocks as illustrated in the example of FIG. 30.

The reference block 108 moves in the search area 106. In this case, the center of the reference block 108 moves in the search area 106. As described earlier, the reference block 108 is made up of a plurality of horizontal and vertical pixels. Therefore, the largest area in which the reference block 108 to be matched against the template block 102 moves is a matching area 110 which is larger than the search area 106 as illustrated in FIG. 30.

The position of the reference block 108 detected to have the highest degree of correlation in image content to the template block 102 is detected as the position of the template block 102 (after the motion) in the reference frame 101. The detected reference block is determined to be the motion compensation block 103. Then, the displacement between the detected position of the motion compensation block 103 and that of the template block 102 is detected as the motion vector 104 which is a magnitude containing a direction component (refer to FIG. 27B).

Here, the correlation level representing how well the template block 102 and the plurality of reference blocks 108 set in the search area 106 are correlated with each other are basically calculated using the associated pixel values of the template block 102 and reference blocks 108. A variety of methods have been proposed to obtain the correlation level, including one using a mean square and another adapted to calculate the sum of the differences of the pixels in the block.

As described above, the block matching method calculates the degree of correlation between the reference and template blocks as an evaluation level indicating whether the blocks are analogous to each other. Next, the reference block with a high calculated degree of correlation (high evaluation level) is detected in the search area. Then, the magnitude and direction of displacement between the reference block with a high evaluation level and the template block is detected as the motion vector relative to the template block.

The above block matching method calculates the degree of correlation between the plurality of reference blocks set in the search area and the template block for each of the reference blocks, thus resulting in a large number of image processing operations (image processing cycles) and leading to high power consumption.

In order to solve this problem, a method has been proposed. This method organizes the template and reference frames into layers. Each of the layers includes a high resolution image or a low resolution image obtained by reducing the high resolution image. A motion vector is calculated for each layer (refer to Japanese Patent Laid-Open No. 2009-55410, which is hereinafter referred to as Patent Document 1).

This layered motion vector calculation method finds a motion vector relative to the template block for the low resolution image to determine the search area of the reference block relative to the template block in the high resolution image based on the found motion vector. This makes it possible to reduce the search area of the reference block in the reference frame for the high resolution image.

From the above, the layered method provides a reduced number of pixels for calculation of a motion vector in the low resolution image, thus ensuring reduced arithmetic operations for calculation of the degree of correlation between the template and reference blocks. Thanks to the motion vector obtained based on the low resolution image, the search area of the reference block relative to the template block can be reduced in the high resolution image. This makes it possible to calculate a motion vector relative to the template block for the target resolution image with a small number of image processing operations (image processing cycles).

However, even the layered motion vector calculation method cannot find an accurate motion vector if the image is reduced at a high reduction ratio. Therefore, the layered motion vector calculation alone has its limitations in reducing the number of image processing operations and power consumption.

In contrast, Japanese Patent Laid-Open No. 2004-56305, which is hereinafter referred to as Patent Document 2, for example, discloses a technique devised to organize low and high frequency images into layers by separating images into frequency bands. This technique skips the motion vector calculation for a high frequency image when the sum of high frequency components is below the threshold.

SUMMARY OF THE INVENTION

However, the method disclosed in Patent Document 2 requires processing operations for separating an image signal into frequency bands for layered organization of images, resulting in increased rather than reduced image processing operations.

Further, the method disclosed in Patent Document 2 skips the motion vector calculation for the entire high frequency image frame. Therefore, if the high frequency image accounts for a high proportion of the entire frame, the motion vector calculation is not skipped, thus making it impossible to reduce the number of calculations.

In light of the foregoing, it is desirable to provide an image processing device and method for more efficiently reducing the number of processing cycles for reduced power consumption.

In order to solve the above problem, an image processing device according to an embodiment of the present invention includes a high resolution template frame buffer, high resolution reference frame buffer, low resolution template frame buffer, low resolution reference frame buffer, a low resolution motion vector calculation section, a high resolution motion vector calculation section and a high resolution layer calculation determination section. The high resolution template frame buffer stores image information of a high resolution template frame. The high resolution reference frame buffer stores image information of a high resolution reference frame. The low resolution template frame buffer stores image information of a low resolution template frame obtained by reducing the image of the high resolution template frame. The low resolution reference frame buffer stores image information of a low resolution reference frame obtained by reducing the image of the high resolution reference frame. The low resolution motion vector calculation section calculate a low resolution layer motion vector for each of blocks of a low resolution layer in the low resolution template and reference frames. Each of the blocks is of a predetermined size and made up of a plurality of pixels. The high resolution motion vector calculation section calculate a high resolution layer motion vector for each of blocks of a high resolution layer in the high resolution template and reference frames using the calculation result of the low resolution layer motion vector. The blocks of the high resolution layer are of a size associated with those of the low resolution layer. The high resolution layer calculation determination section determines whether or not to calculate a motion vector for each of the blocks of the high resolution layer.

If the high resolution layer calculation determination section determines that a motion vector should be calculated for the blocks of the high resolution layer, the high resolution motion vector calculation section is activated to calculate a motion vector in the high resolution layer. On the other hand, if the high resolution layer calculation determination section determines that a motion vector need not be calculated for the blocks of the high resolution layer, the high resolution motion vector calculation section is not activated. Instead, a motion vector is used as a substitute which is obtained by scaling the motion vector of the low resolution layer, calculated by the low resolution motion vector calculation section, according to the image size of the high resolution layer.

The image processing device according to the embodiment configured as described above organizes the frames into layers not by separation into frequency bands but by image reduction, thus making the layered process simple.

In the high resolution layer, whether to calculate the motion vector is determined block by block of the high resolution template frame. This makes it possible to skip the motion vector calculation for the blocks of the high resolution layer as appropriate according to the image content of the template and reference frames for which a motion vector is to be calculated.

The present embodiment determines whether to calculate a motion vector in the high resolution layer block by block of the high resolution template frame. This makes it possible to skip the motion vector calculation for the blocks of the high resolution layer as appropriate according to the image content of the template and reference frames, thus providing reduced number of processing cycles and reduced power consumption with accuracy.

BRIEF DESCRIPTION OF THE DRAWINGS

FIGS. 4A to 4C are diagrams for describing the layered block matching process used for the embodiments of the image processing device according to the present invention;

FIG. 6 is a diagram for describing the layered block matching process used for the embodiments of the image processing device according to the present invention;

FIG. 7 is a diagram illustrating calculation formulas used to describe the embodiments of the image processing device according to the present invention;

FIG. 26 is a flowchart for describing the process flow in the image processing device according to still another embodiment of the present invention;

FIGS. 27A and 27B are diagrams for describing the outline of the block matching process used for the embodiments of the image processing device according to the present invention;

FIG. 28 is a diagram for describing the outline of the block matching process used for the embodiments of the image processing device according to the present invention;

DETAILED DESCRIPTION OF THE PREFERRED EMBODIMENTS

A description will be given below of some of the embodiments of the image processing device and method according to the present invention with reference to the accompanying drawings.

A general outline will be given below of the image processing device using the layered motion vector calculation method used for the embodiments of the present invention before proceeding with the description of the embodiments.

In the present embodiments, a reduced image (low resolution image) is prepared from an original image (high resolution image) first. Next, a motion vector is found in the reduced image by block matching. Finally, block matching is performed in the original high resolution image based on the detection result of the motion vector in the reduced image.

Figure 2:
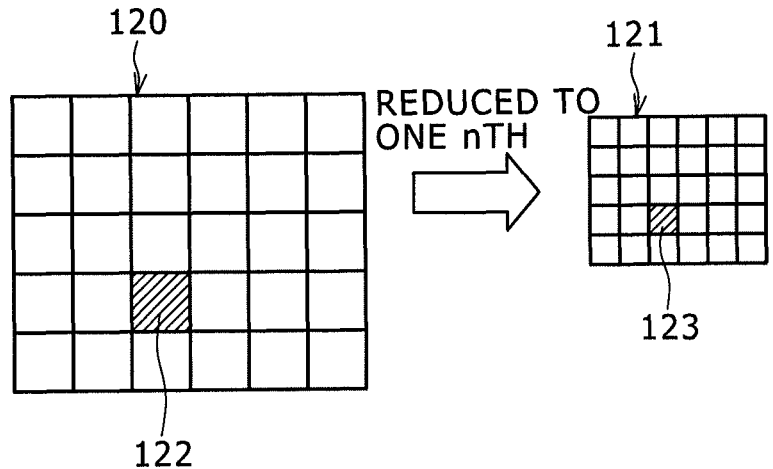
FIG. 2 is a diagram for describing a layered block matching process used for the embodiments of the image processing device according to the present invention.
Figure 3:
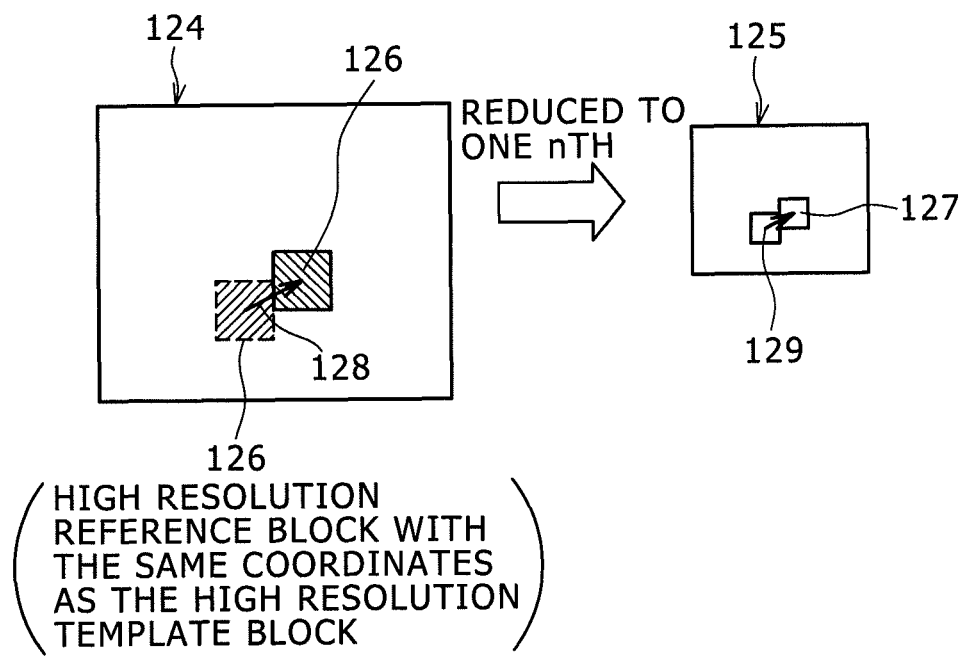
FIG. 3 is a diagram for describing the layered block matching process used for the embodiments of the image processing device according to the present invention.

FIGS. 2 and 3 illustrate conceptual rendering of the image reduction of the template and reference frames. That is, in the present embodiment, a high resolution template frame 120 is reduced both horizontally and vertically to one nth (n: positive integer) to produce a low resolution template frame 121. That is, the horizontal and vertical pixels are reduced in number to one nth to produce low resolution image information.

As described earlier, a motion vector is detected for each of a plurality of blocks into which the frame is divided. A high resolution template block 122, produced by dividing the high resolution template frame 120 into a plurality of blocks, is reduced, changing into a low resolution template block 123 in the low resolution template frame. The low resolution template block 123 is both horizontally and vertically reduced to one nth.

The reference frame is reduced at the same image reduction ratio as the template frame or one nth. That is, a high resolution reference frame 124 is both horizontally and vertically reduced to one nth as illustrated in FIG. 3 to produce a low resolution reference frame 125.

A high resolution reference block 126 set in the high resolution reference frame 124 changes into a low resolution reference block 127 in the low resolution reference frame 125. The low resolution reference block 127 is reduced both horizontally and vertically to one nth. A high resolution motion vector 128 detected in the high resolution reference frame 124 is detected in the low resolution reference frame 125 as a low resolution motion vector 129 that is both horizontally and vertically reduced to one nth.

FIGS. 4A to 4C illustrate the relationship between the low and high resolution motion vectors. Search areas set in the reference frames are centered, for example, at motion detection origins 131 and 132 that are identical to the centers of the reference blocks located at the positions associated with those of the reference blocks.

A low resolution search area 134 set in the low resolution reference frame 125, that has been reduced horizontally and vertically to one nth, as illustrated in FIG. 4B, changes into a larger area or a search area 133 in the high resolution reference frame 124 as illustrated in FIG. 4A.

In this example of the layered process, low resolution reference vectors 135 are set in the low resolution search area 134. The same vectors 135 represent the displacement from the motion detection origin 132 in the low resolution reference frame 125. The correlation is evaluated between the low resolution reference block 127 located at the position indicated by each of the low resolution reference vectors 135 and the low resolution template block 123 (refer to FIG. 2).

Then, the low resolution reference vector for the low resolution reference block 127 with a high correlation evaluation level is detected as the low resolution motion vector 129 (refer to FIG. 3).

In this case, block matching is performed in the reduced image, thus providing a smaller number of positions of the low resolution reference blocks for which a correlation level is to be calculated in the low resolution reference frame 125. This provides a smaller number of times a correlation level is calculated (matching process is performed), thus providing reduced power consumption.

Figure 5:
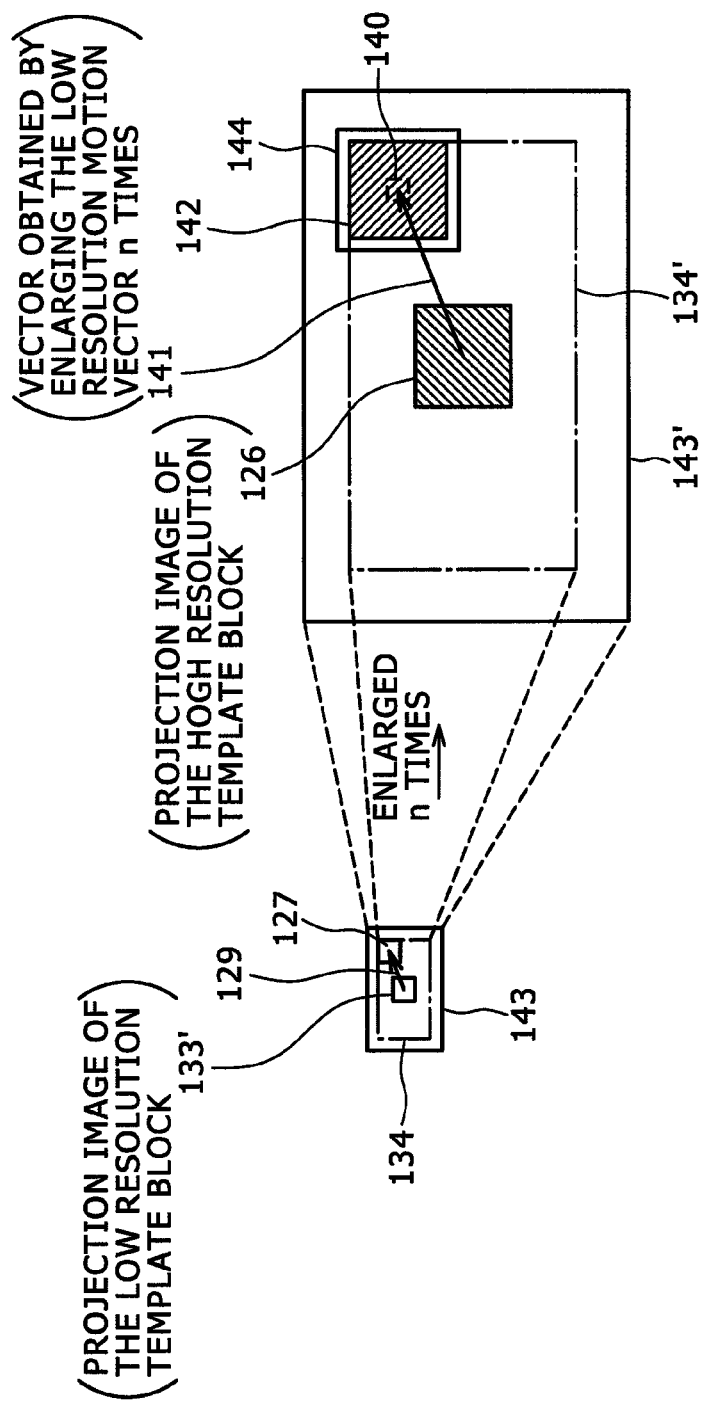
FIG. 5 is a diagram for describing the layered block matching process used for the embodiments of the image processing device according to the present invention.

As illustrated in FIG. 5, a plurality of low resolution reference and template blocks are set in a low resolution matching area 143 that is determined according to the low resolution search area 134. In the same area 143, block matching is performed between the reference and template blocks. The low resolution motion vector 129 in the low resolution reference frame 125 is calculated based on the correlation evaluation from the block matching.

The detected low resolution motion vector 129 is low in accuracy or has an accuracy of n times a pixel because the image is horizontally and vertically reduced to one nth. As a result, multiplying this calculated motion vector 129 by n does not provide any one-pixel-accuracy motion vector in the high resolution reference frame 124.

However, it is obvious that there is a one-pixel-accuracy high resolution motion vector near the motion vector, obtained by multiplying the low resolution motion vector 129 by n, in the high resolution reference frame 124.

In this example, therefore, a high resolution search area 140 is set in the high resolution reference frame 124 as illustrated in FIGS. 4C and 5. The same area 140 is centered at the position indicated by the motion vector obtained by multiplying the low resolution motion vector 129 by n. The position indicated by the motion vector obtained by multiplying the low resolution motion vector 129 by n is set as the origin of the high resolution motion vector detected in the high resolution reference frame 124.

The high resolution search area 140 is a small area in which a high resolution motion vector likely exists. The same area 140 can be set considerably smaller than the search area 133 (refer to FIG. 4A) that is set when no layered process is performed in the high resolution reference frame 124. A high resolution matching area 144 is set according to the high resolution search area 140 that has been set.

High resolution reference vectors of the high resolution reference frame 124 are set as position indicators in the high resolution search area 140. These high resolution reference vectors have their origins at the positions indicated by the motion vector obtained by multiplying the low resolution motion vector 129 by n. High resolution reference blocks 142 are set at the positions indicated by the high resolution reference vectors. The above-described degree of correlation is calculated between the same blocks 142 and the high resolution template block 122 of the high resolution template frame 120.

The high resolution reference vector for the high resolution reference block 142 with the highest degree of correlation with the high resolution template block 122 is detected as the high resolution motion vector.

The block-by-block motion vector of interest for the high resolution template block is detected as a combined vector of two vectors, i.e., the high resolution motion vector detected in the high resolution reference frame 124 and the low resolution motion vector detected in the low resolution reference frame 125.

That is, in this example of the layered process, the low resolution template block 123 is set, as illustrated in FIG. 6, in the low resolution template frame 121 which is an image reduced from the original image. The low resolution template block 123 is associated with the high resolution template block set in the high resolution template frame 120. The low resolution motion vector 129 for the low resolution template block 123 is found by block matching between the low resolution template frame 121 and low resolution reference frame 125.

Next, a search area is set in the high resolution reference frame 124 with its origin at the position indicated by a motion vector 151. The same vector 151 is obtained by multiplying the low resolution motion vector 129 by n. A plurality of high resolution reference blocks are set in the search area. A degree of correlation is found between each of the plurality of high resolution reference blocks and high resolution template block 122. The high resolution reference vector associated with the high resolution reference block with the highest degree of correlation is detected as the high resolution motion vector 152.

A block-by-block motion vector 153 of interest for the high resolution template block 122 is detected as a combined vector of two vectors, i.e., the motion vector 151 obtained by multiplying the low resolution motion vector 129 by n and a high resolution motion vector 152.

Here, letting the low resolution motion vector 129 be denoted by MV1, the high resolution motion vector 152 by MV2, and the block-by-block motion vector 153 of interest by MV, MV is calculated by the following equation:

$$MV = nMV1 + MV2$$

As illustrated in FIG. 5, the high resolution search area 140 and high resolution matching area 144 set in the high resolution reference frame 124 are respectively significantly smaller than a search area 134' and matching area 143'. The search area 134' and matching area 143' are obtained respectively by multiplying the low resolution search area 134 and low resolution matching area 143 by n which is the reciprocal of the reduction ratio.

If block matching is performed in the high resolution layer without layered matching, a plurality of reference blocks must be set in the search area 134' and matching area 143' to calculate the correlation levels with the template blocks. However, the layered matching process need only perform matching in the significantly small areas as illustrated in FIG. 5.

Therefore, only a significantly small number of high resolution reference blocks are set in these small areas, namely, high resolution search area 140 and high resolution matching area 144, thus providing a significantly smaller number of matchings (number of calculations of correlation levels). This provides a reduced amount of processing for reduced power consumption and faster processing.

It should be noted that the template and reference frames were reduced at the same image reduction ratio in the above description. However, the matching can be performed in such a manner that, for reducing the number of calculation, the template and reference frames are reduced at different image reduction ratios and the numbers of pixels of the two frames are set equal to each other, for example, through pixel interpolation.

In the above description, on the other hand, the horizontal and vertical image reduction ratios were the same. However, the horizontal and vertical reduction ratios may be different. For example, if the frame is reduced horizontally to one nth and vertically to one mth (m: positive number and n≠m), the reduced screen is horizontally one nth and vertically one mth of the original size.

It should be noted that, in the above layered process, the block-by-block motion vector of interest was calculated as a combined vector of the low and high resolution motion vectors. The reason for this is that the high resolution reference vectors have their origins at the positions indicated by the motion vector obtained by multiplying the low resolution motion vector by the reciprocal of the image reduction ratio.

If the origins of the high resolution reference vectors are left unchanged at the center of the high resolution template block, the detected high resolution motion vector can be used, as-is, as the block-by-block motion vector of interest.

In the above description, block matching was always performed between the high resolution frames using the block matching results obtained with the low resolution frames.

In contrast, the embodiments according to the present invention determine, in the high resolution layer, whether to calculate a motion vector for each of the high resolution template blocks of the high resolution frame. If it is determined that a motion vector need not be calculated, the motion vector calculation is skipped for the high resolution template blocks.

In the high resolution layer, the motion vector for the high resolution template block for which no motion vector is calculated is substituted by the motion vector obtained by multiplying the low resolution motion vector by the reciprocal of the image reduction ratio, the low resolution motion vector obtained for the low resolution template block being corresponding to the high resolution template block of interest.

As will be described below, there are several methods used to determine whether to calculate a motion vector for each of the high resolution template blocks in the high resolution layer. A plurality of embodiments described below differ in how they determine whether to calculate a motion vector for each of the high resolution template blocks. All the embodiments allow for the above-described layered process as a prerequisite.

First Embodiment

Figure 1:
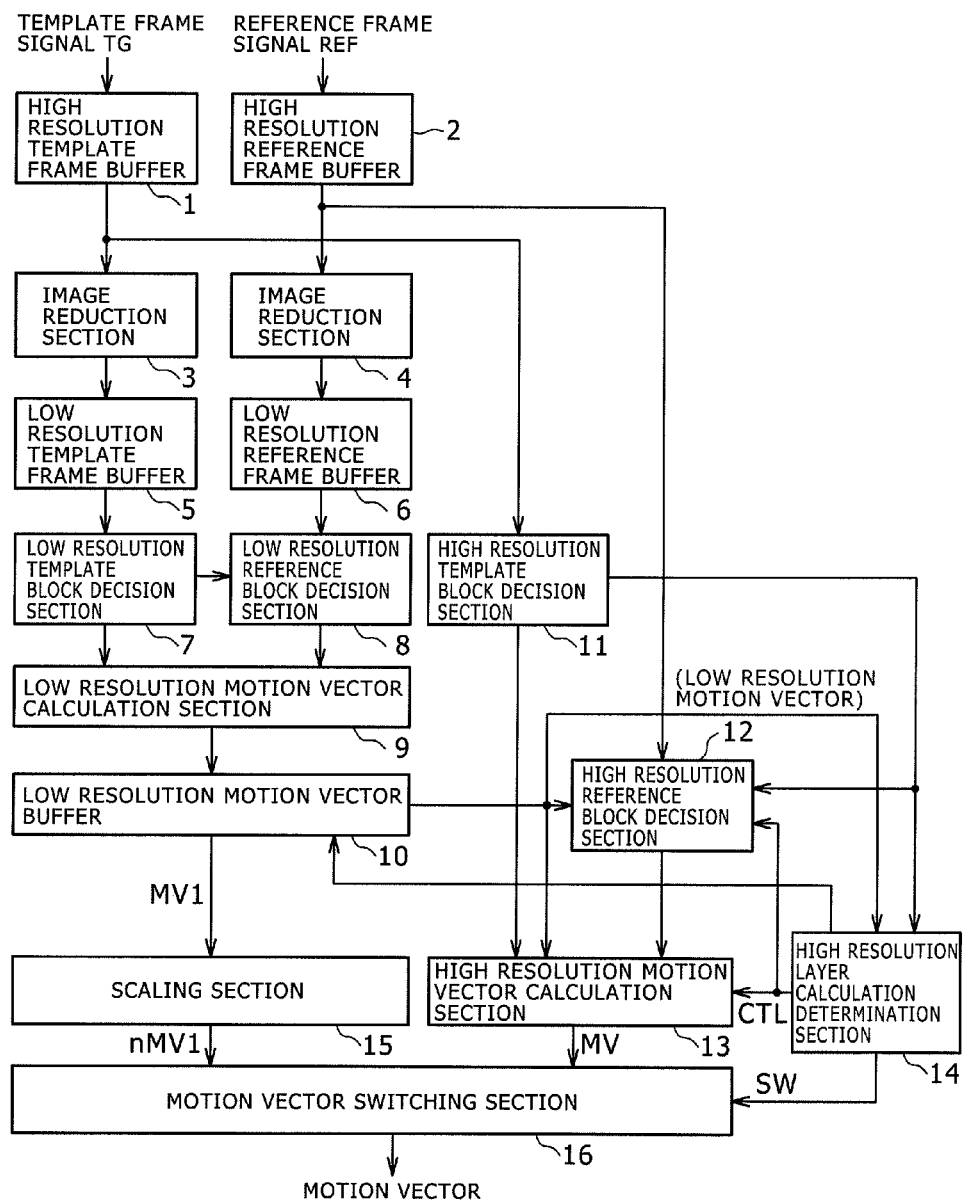
FIG. 1 is a block diagram illustrating an example of hardware configuration of a first embodiment of an image processing device according to the present invention.

FIG. 1 is a block diagram illustrating a configuration example of the major components of the image processing device according to a first embodiment of the present invention. It should be noted that not only the image processing device according to this first embodiment but also others according to the embodiments described later are, for example, motion vector detectors adapted to detect a motion vector from a moving image signal.

The first embodiment uses only information in the low resolution layer to determine whether to calculate a motion vector for each of the high resolution template blocks. In this example, information of only a low resolution image, i.e., reduced image of the original image, is used, thus providing further reduced processing cycles and power consumption.

As illustrated in FIG. 1, in this example, a moving image signal of each of the previous frames delayed by one frame is loaded into a high resolution template frame buffer 1 as a template frame signal TG.

A moving image signal of each of the current frames is loaded into a high resolution reference frame buffer 2 as a reference frame signal REF.

The high resolution template frame buffer 1 and high resolution reference frame buffer 2 may respectively include separate frame memories. Alternatively, the two buffers may include different memory areas of a single image memory that can store a plurality of frames.

The image signal of a high resolution template frame loaded into the high resolution template frame buffer 1 is reduced by an image reduction section 3 to one nth of the original for use as an image signal of a low resolution template frame as described above, after which the resultant signal is stored in a low resolution template frame buffer 5.

The image signal of a high resolution reference frame loaded into the high resolution reference frame buffer 2 is reduced by an image reduction section 4 to one nth of the original for use as an image signal of a low resolution reference frame as described above, after which the resultant signal is stored in a low resolution reference frame buffer 6.

The low resolution template frame buffer 5 and low resolution reference frame buffer 6 may also respectively include separate frame memories. Alternatively, the two buffers may include different memory areas of a single image memory that can store a plurality of frames.

A low resolution template block decision section 7 sequentially determines a low resolution template block, for which a low resolution motion vector is to be detected, from among a plurality of low resolution template blocks set in the low resolution template frame. The same section 7 reads the image signal of the determined low resolution template block from the low resolution template frame buffer 5 and supplies the signal to a low resolution motion vector calculation section 9.

The low resolution template block decision section 7 notifies a low resolution reference block decision section 8 of position information about the determined low resolution template block.

The low resolution reference block decision section 8 determines a search area (matching area) in the low resolution reference frame based on the position information about the determined low resolution template block from the low resolution template block decision section 7. The same section 8 sequentially reads a plurality of low resolution reference blocks of the determined search area from the low resolution reference frame buffer 6 and supplies these blocks to the low resolution motion vector calculation section 9.

The low resolution motion vector calculation section 9 calculates the degree of correlation between the low resolution template block and each of the plurality of low resolution reference blocks in the determined search area.

In this example, as a correlation level serving as a scale indicating a correlation degree, the sum of the absolute values of the differences (refer to Equation 1 in FIG. 7) for all pixels in the blocks is used between the brightness levels of the pixels in the low resolution template block and the brightness levels of the pixels in the low resolution reference blocks. This sum of the absolute values of the differences is referred to as the sum of absolute differences. This sum of absolute differences will be hereinafter referred to as the SAD (Sum of Absolute Difference) value. If the SAD value is used as a correlation level, the smaller the SAD value, the more correlated the two blocks are (the higher the degree of correlation).

The low resolution motion vector calculation section 9 detects the low resolution reference vector associated with the low resolution block with the highest degree of correlation as the low resolution motion vector for the low resolution template block.

The same section 9 stores the position information about the low resolution template block in the low resolution template frame and the low resolution motion vector detected for the low resolution template block in a low resolution motion vector buffer 10.

The low resolution motion vector buffer 10 stores position information about all the low resolution template blocks in the low resolution template frame and the low resolution motion vectors detected for the low resolution template blocks.

Figure 8:
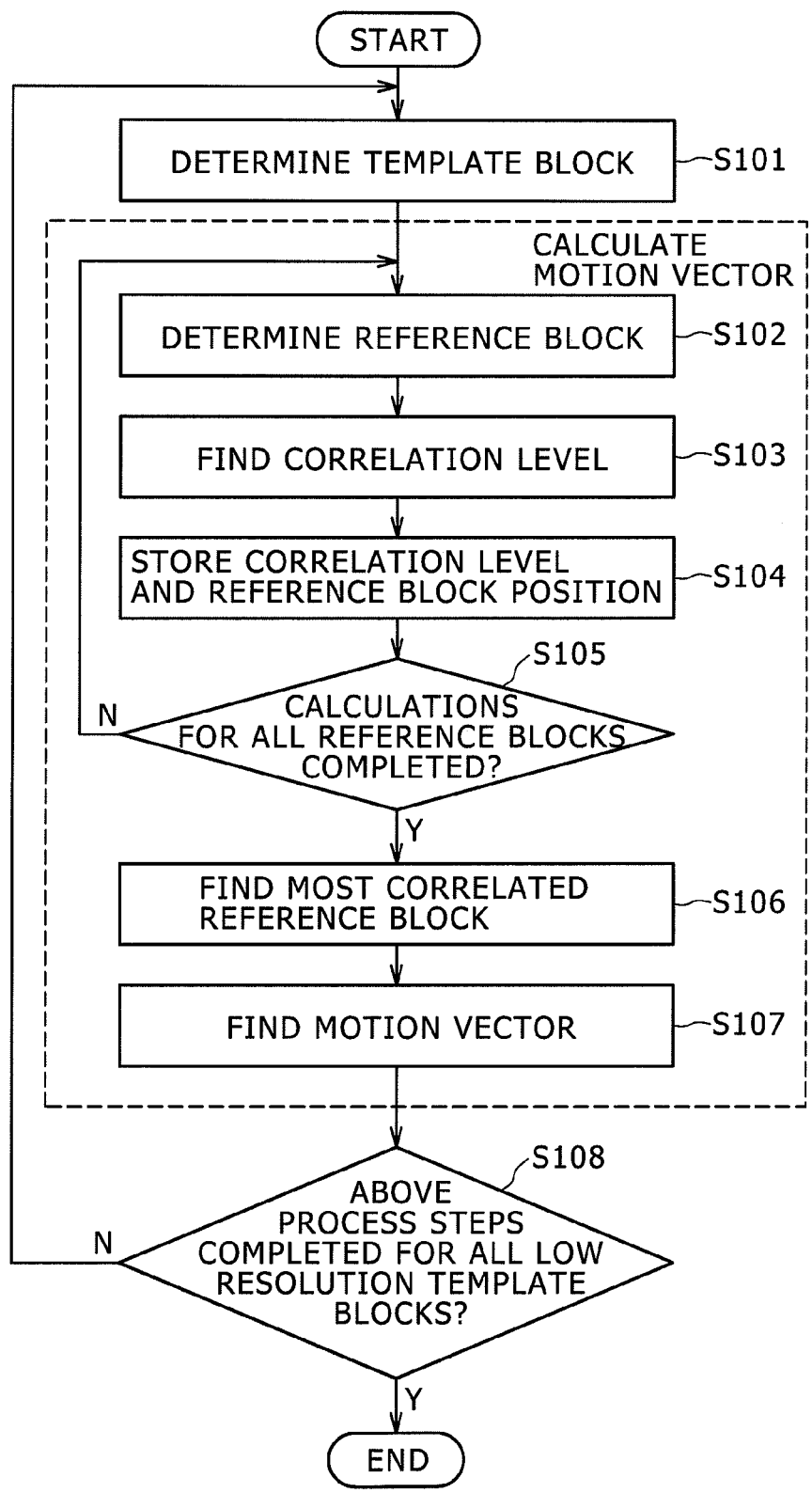
FIG. 8 is a flowchart for describing the flow of the block matching process used for the embodiments of the image processing device according to the present invention.

FIG. 8 illustrates the flow of the processes performed by the low resolution template block decision section 7, low resolution reference block decision section 8 and low resolution motion vector calculation section 9. FIG. 8 illustrates the flow of the processes performed for all the low resolution template blocks of a single low resolution template frame.

The process flow shown in FIG. 8 is identical to that if the processes of the low resolution template block decision section 7, low resolution reference block decision section 8 and low resolution motion vector calculation section 9 are performed, for example, by software using a microcomputer.

It should be noted that FIG. 8 does not clearly state that the template and reference blocks are those in the low resolution layer. This is done in consideration of the fact that the motion vectors are calculated in the same manner in the high resolution layer.

First, a low resolution template block is determined for which a low resolution motion vector is to be found in the low resolution template frame (step S101). Next, a search area is determined for the low resolution template block that has been determined, after which a low resolution reference block is determined in the search area (step S102).

Next, a correlation level is found between the low resolution reference block determined in step S102 and the low resolution template block determined in step S101 (step S103). In this example, an SAD value is found as a correlation level as described earlier.

Next, the correlation level (SAD value) that has been found and the position of the low resolution reference block in the low resolution reference frame are stored in association with each other (step S104).

Next, it is determined whether or not the correlation level calculation has been completed for all the low resolution reference blocks in the search area (step S105).

If it is determined in step S105 that the calculation has yet to be completed for all the low resolution reference blocks, control returns to step S102 where a low resolution reference block, for which the correlation level calculation has yet to be completed, is determined in the search area, after which the process steps beyond step S102 are repeated.

If it is determined in step S105 that the calculation for the correlation level has been completed for all the low resolution reference blocks in the search area, the low resolution reference block with the highest degree of correlation is detected from among the low resolution reference blocks in the search area (step S106). If the correlation level is an SAD value, the low resolution reference block with the smallest SAD value is detected.

After the detection of the low resolution reference block with the highest degree of correlation in step S106, the reference vector associated with the detected low resolution reference block is detected as the low resolution motion vector and written to the low resolution motion vector buffer 10 (step S107).

Next, it is determined whether or not the detection of the low resolution motion vectors has been completed for all the low resolution template blocks in the low resolution template frame (step S108).

If it is determined in step S108 that the detection of the low resolution motion vectors has yet to be completed for all the low resolution template blocks in the low resolution template frame, control returns to step S101. A low resolution template block, for which a low resolution motion vector has yet to be detected in the low resolution template frame, is determined, after which the process steps beyond step S101 are repeated.

If it is determined in step S108 that the detection of the low resolution motion vectors has been completed for all the low resolution template blocks in the low resolution template frame, this process routine is terminated.

A description will be given below of the configuration of the high resolution layer shown in FIG. 1.

A high resolution template block decision section 11 sequentially determines a high resolution template block, for which a high resolution motion vector is to be detected, from among a plurality of high resolution template blocks set in the high resolution template frame. The same section 11 reads the image signal of the determined high resolution template block from the high resolution template frame buffer 1 and supplies the signal to a high resolution motion vector calculation section 13.

The high resolution template block decision section 11 notifies a high resolution reference block decision section 12 of position information about the determined high resolution template block.

The high resolution reference block decision section 12 obtains the low resolution motion vector for the associated low resolution template block from the low resolution motion vector buffer 10 based on the position information about the high resolution template block supplied from the high resolution template block decision section 11.

The same section 12 determines a search area (matching area) in the high resolution reference frame based on the position information about the high resolution template block supplied from the high resolution template block decision section 11 and the low resolution motion vector obtained from the low resolution motion vector buffer 10.

The same section 12 sequentially reads a plurality of high resolution reference blocks of the determined search area from the high resolution reference frame buffer 2 and supplies these blocks to the high resolution motion vector calculation section 13.

The high resolution motion vector calculation section 13 calculates the degree of correlation between the high resolution template block and each of the plurality of high resolution reference blocks in the determined search area in the same manner as in the process flow shown in FIG. 8.

It should be noted, however, that the determination of a search area during determination of a reference block in step S102 in the high resolution layer differs from that in the low resolution layer in that not only the high resolution motion vector but also the low resolution motion vector are used as described above.

In this example, the high resolution motion vector calculation section 13 further performs a calculation to combine the high resolution motion vector that has been found and the associated low resolution motion vector from the low resolution motion vector buffer 10 to obtain a post-layered-process motion vector.

An existing layered process outputs a motion vector obtained by the high resolution motion vector calculation section 13 as its final motion vector. In this case, the motion vector detected in step S107 of FIG. 8 is stored in a buffer. In the high resolution layer, however, the motion vector is output without being stored in a buffer.

In the layered process of the image processing device according to the embodiments of the present invention, the image processing device determines in the high resolution layer whether or not to calculate the above motion vector for each of the high resolution template blocks that have been set. If the image processing device determines that the motion vector should be calculated in the high resolution layer, the same device outputs the motion vector found by the high resolution motion vector calculation section 13. On the other hand, if the image processing device determines that the motion vector need not be calculated in the high resolution layer, the same device outputs the motion vector, obtained by multiplying the low resolution motion vector found for the low resolution template block at the position associated with the high resolution template block, by the reciprocal of the image reduction ratio as a substitute motion vector.

Therefore, the image processing device according to the embodiments of the present invention includes a high resolution layer calculation determination section 14, scaling section 15 and motion vector switching section 16.

The scaling section 15 multiplies a low resolution motion vector from the low resolution motion vector buffer 10 by the reciprocal of the image reduction ratio and supplies the resultant motion vector to the motion vector switching section 16.

The motion vector switching section 16 receives two motion vectors, i.e., one from the high resolution motion vector calculation section 13 and another from scaling section 15, selects one of the two vectors and outputs the selected motion vector.

The high resolution layer calculation determination section 14 receives the position information about the determined high resolution template block from the high resolution template block decision section 11. The same section 14 identifies the determined high resolution template block based on the received position information and determines whether or not to calculate a motion vector for the high resolution template block in the high resolution layer as described later.

The high resolution layer calculation determination section 14 supplies a control signal CTL to the high resolution motion vector calculation section 13 and high resolution reference block decision section 12 to determine whether or not to perform the calculations and processes. Further, in this example, the same section 14 supplies a switching control signal SW to the motion vector switching section 16 to select and output which of the two motion vectors.

If the high resolution layer calculation determination section 14 determines that the calculations should be performed in the high resolution layer, the same section 14 instructs the high resolution motion vector calculation section 13 and high resolution reference block decision section 12 to perform the calculations and processes using the control signal CTL. Further, if the high resolution layer calculation determination section 14 determines that the calculations should be performed in the high resolution layer, the same section 14 instructs the motion vector switching section 16 to select and output the motion vector from the high resolution motion vector calculation section 13 using the switching control signal SW.

On the other hand, if the high resolution layer calculation determination section 14 determines that the calculations need not be performed in the high resolution layer, the same section 14 instructs the high resolution motion vector calculation section 13 and high resolution reference block decision section 12 not to perform any calculations or processes using the control signal CTL.

Further, if the high resolution layer calculation determination section 14 determines that the calculations need not be performed in the high resolution layer, the same section 14 transmits an instruction to the low resolution motion vector buffer 10 that the low resolution motion vector associated with the position of the high resolution template block should be read. As a result, the low resolution motion vector buffer 10 supplies the low resolution motion vector to the scaling section 15. The scaling section 15 multiplies the received low resolution motion vector by the reciprocal of the image reduction ratio and supplies the resultant motion vector to the motion vector switching section 16.

If the high resolution layer calculation determination section 14 determines that the calculations need not be performed in the high resolution layer, the same section 14 instructs the motion vector switching section 16 to select and output the motion vector from the scaling section 15 using the switching control signal SW. Therefore, if the same section 14 determines that the calculations need not be performed in the high resolution layer, the motion vector switching section 16 outputs the motion vector, obtained by multiplying the low resolution motion vector from the scaling section 15 by the reciprocal of the image reduction ratio.

<Determination by the High Resolution Layer Calculation Determination Section 14 in the First Embodiment>

In the first embodiment, the high resolution layer calculation determination section 14 makes a determination as described below.

The same section 14 obtains the low resolution motion vector for the low resolution template block associated with the high resolution template block determined by the high resolution template block decision section 11. The same section 14 obtains the same motion vector from the low resolution motion vector buffer 10. That is, the same section 14 transmits an instruction to the same buffer 10 that the low resolution motion vector for the low resolution template block associated with the high resolution template block should be read, thus obtaining the same motion vector.

In the first embodiment, the high resolution layer calculation determination section 14 determines whether or not the obtained low resolution motion vector is greater than the predetermined threshold. The same section 14 determines, according to the determination result, whether to calculate a motion vector in the high resolution layer.

Here, the same section 14 calculates a magnitude $|V(x,y)|$ of the motion vector $(x,y)$ using the Euclidean distance shown in Equation 2 and the Manhattan distance shown in Equation 3 of FIG. 7.

If the high resolution layer calculation determination section 14 determines that the magnitude of the low resolution motion vector is equal to or greater than the predetermined threshold, the same section 14 determines that a motion vector should be calculated in the high resolution layer. As a result, the same section 14 outputs the control signal CTL and switching control signal SW commensurate with the determination result. On the other hand, if the high resolution layer calculation determination section 14 determines that the magnitude of the low resolution motion vector is smaller than the predetermined threshold, the same section 14 determines that a motion vector need not be calculated in the high resolution layer. As a result, the same section 14 outputs the control signal CTL and switching control signal SW commensurate with the determination result.

The same section 14 makes these determinations because when the magnitude of the low resolution motion vector is smaller than the predetermined threshold, it is likely that only a small motion takes place between two screens and that there is only a slight difference between the final motion vector obtained by using the high resolution motion vector and the low resolution motion vector.

Therefore, the threshold is determined according to the level that can be tolerated as a difference between the final motion vector obtained by using the high resolution motion vector and the low resolution motion vector.

Figure 9:
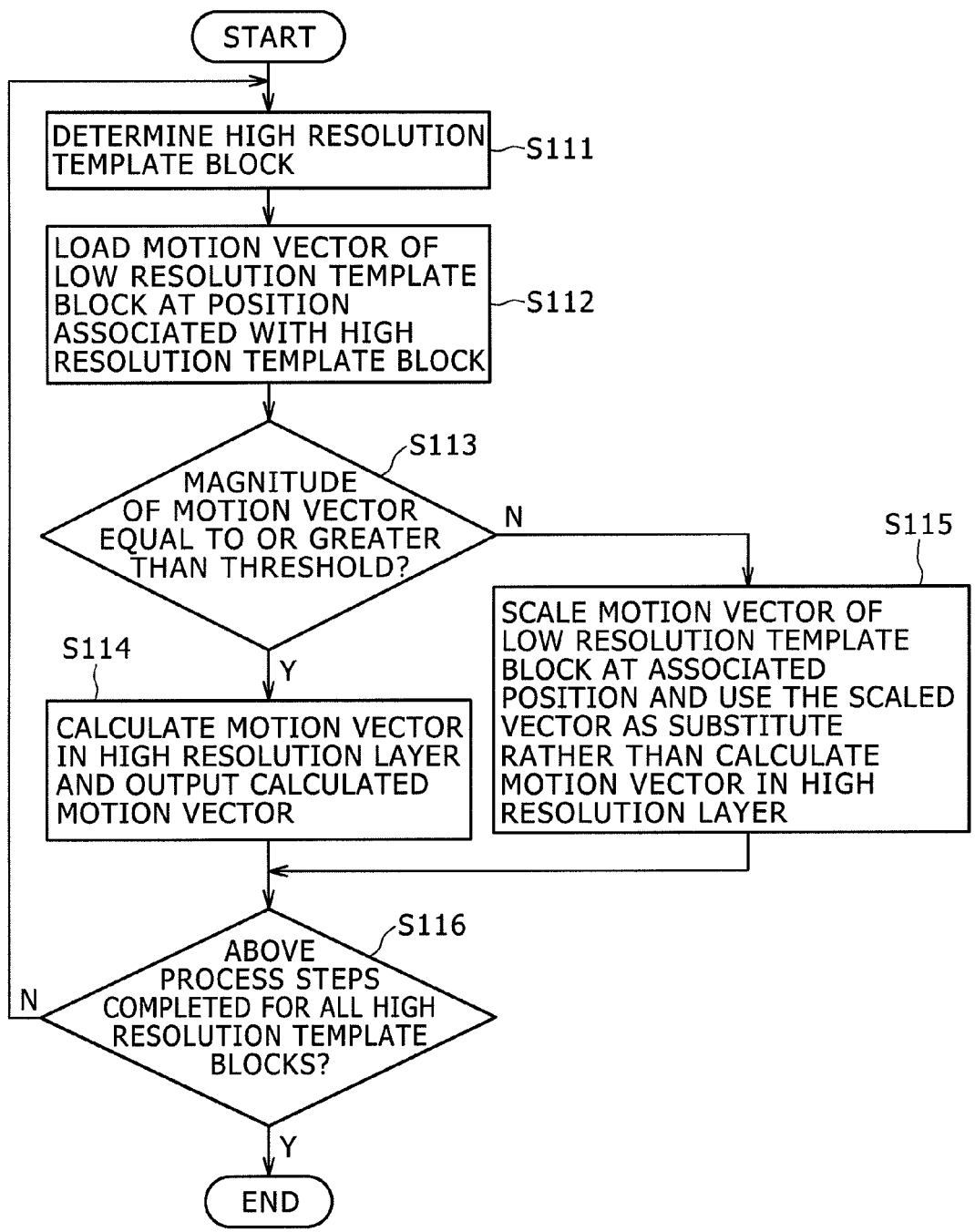
FIG. 9 is a flowchart for describing the process flow in the image processing device according to the first embodiment of the present invention.

A description will be given below of the process flow in the high resolution layer in the first embodiment with reference to the flowchart shown in FIG. 9.

The processes shown in this flowchart correspond to the software processes if the high resolution template block decision section 11, high resolution reference block decision section 12, high resolution motion vector calculation section 13 and high resolution layer calculation determination section 14 are made up of a microcomputer. The same is true for other embodiments which will be described later.

First, a high resolution template block is determined for which a high resolution motion vector is to be found in the high resolution template frame (step S111).

Next, the motion vector of the low resolution template block (low resolution motion vector) at the position associated with the determined high resolution template block is obtained from the low resolution motion vector buffer 10 (step S112).

The magnitude of the obtained low resolution motion vector is calculated to determine whether or not the magnitude thereof is equal to or greater than the threshold (step S113).

If it is determined in step S113 that the calculated magnitude of the low resolution motion vector is equal to or greater than the threshold, a motion vector is calculated in the high resolution layer. The found motion vector is output to the motion vector switching section 16 (step S114). The process flow in step S114 is identical in detail to that for the motion vector calculation enclosed by a dashed line in FIG. 8.

On the other hand, if it is determined in step S113 that the calculated magnitude of the low resolution motion vector is smaller than the threshold, a motion vector is not calculated in the high resolution layer. Instead, the low resolution motion vector at the position associated with the high resolution template block is read from the low resolution motion vector buffer 10. Further, the motion vector, obtained by multiplying the low resolution motion vector from the scaling section 15 by the reciprocal of the image reduction ratio, is output from the motion vector switching section 16 (step S115).

After steps S114 and S115, it is determined whether or not the process steps have been completed for all the high resolution template blocks (step S116). If it is determined in step S116 that the process steps have yet to be completed for all the high resolution template blocks, control returns to step S111 where an unprocessed next high resolution template block is set, after which the process steps beyond step S111 are repeated. On the other hand, if it is determined in step S116 that the process steps have been completed for all the high resolution template blocks, this process routine is terminated.

Second Embodiment

Figure 10:
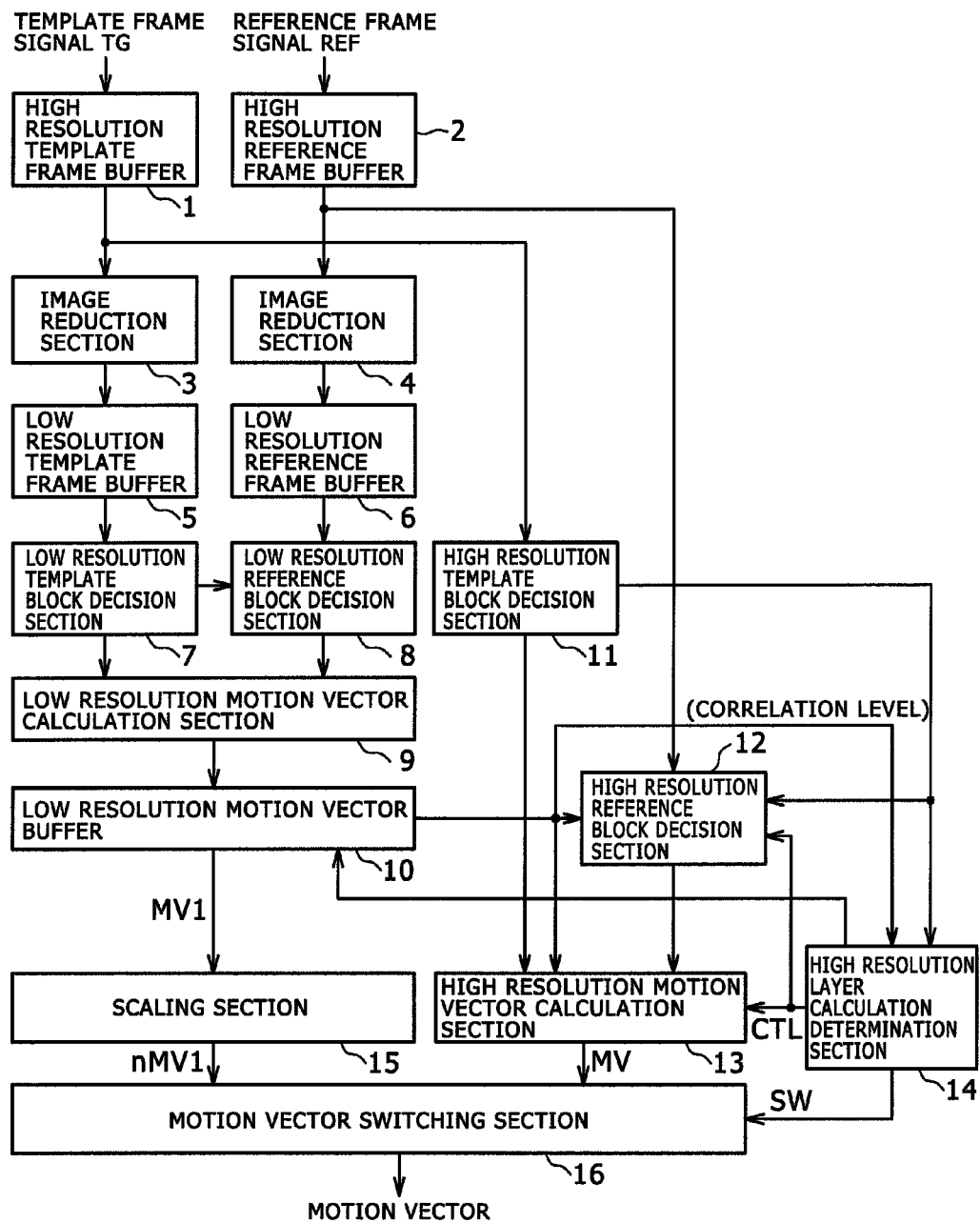
FIG. 10 is a block diagram illustrating an example of hardware configuration of the image processing device according to a second embodiment of the present invention.

FIG. 10 is a block diagram illustrating a configuration example of the major components of the image processing device according to a second embodiment of the present invention. In FIG. 10, like components as those of the image processing device according to the first embodiment shown in FIG. 1 are designated by like reference numerals.

This second embodiment and other several embodiments which will be described below are completely identical to the first embodiment in configuration and processes except for information supplied to the high resolution layer calculation determination section 14 and the detail of the processes performed using that information.

As with the first embodiment, the second embodiment also uses only the information in the low resolution layer to determine whether or not to calculate a motion vector for each of the high resolution template blocks.

In the second embodiment, the high resolution layer calculation determination section 14 compares the correlation level associated with the motion vector of the low resolution template block (low resolution motion vector) at the position associated with the high resolution template block with the predetermined threshold. The same section 14 determines, based on the comparison result, whether to calculate a motion vector in the high resolution layer.

The correlation level associated with the low resolution motion vector of the low resolution template block represents the degree of correlation between the low resolution reference block associated with the low resolution motion vector and the low resolution template block. The low resolution motion vector found in the low resolution layer is highly reliable when the degree of correlation is considerably high. Therefore, it is likely that there is no need to detect a motion vector in the high resolution layer. It is also likely that there is only a slight difference between the final motion vector obtained by using the high resolution motion vector and the low resolution motion vector.

In the second embodiment, therefore, the high resolution layer calculation determination section 14 compares the correlation level associated with the motion vector of the low resolution template block at the position associated with the high resolution template block with the predetermined threshold to determine whether or not the degree of correlation is considerably high.

If the high resolution layer calculation determination section 14 determines based on the result of comparison between the correlation level and threshold that the degree of correlation is low, the same section 14 determines that a motion vector should be calculated in the high resolution layer. The same section 14 outputs the control signal CTL and switching control signal SW commensurate with the determination result. On the other hand, if the high resolution layer calculation determination section 14 determines based on the result of comparison between the correlation level and threshold that the degree of correlation is high, the same section 14 determines that a motion vector need not be calculated in the high resolution layer. The same section 14 outputs the control signal CTL and switching control signal SW commensurate with the determination result.

In the second embodiment, therefore, the threshold is determined according to the degree of correlation between two vectors, i.e., the low resolution template vector in the low resolution layer based on which it is determined that there is no need to calculate a motion vector in the high resolution layer and the low resolution reference vector detected as the motion vector.

In the second embodiment, the low resolution motion vector buffer stores not only the position information about the low resolution template block and the low resolution motion vector but also the correlation level associated with the low resolution motion vector.

This correlation level is the highest of all correlation levels between the low resolution template block and each of the plurality of low resolution reference blocks in the search area calculated by the low resolution motion vector calculation section 9. If the SAD value is used, this correlation level is the smallest of all the SAD values calculated for the plurality of low resolution reference blocks in the search area.

The high resolution layer calculation determination section 14 according to the second embodiment obtains the correlation level associated with the motion vector of the low resolution template block (low resolution motion vector) at the position associated with the high resolution template block from the low resolution motion vector buffer 10.

As a result, the hardware configuration of the second embodiment shown in FIG. 10 is identical to the block diagram of the first embodiment shown in FIG. 1. However, the first and second embodiments differ in that the information obtained from the low resolution motion vector buffer 10 in the first embodiment is a low resolution motion vector and the information obtained in the second embodiment is a correlation level associated with the low resolution motion vector.

Figure 11:
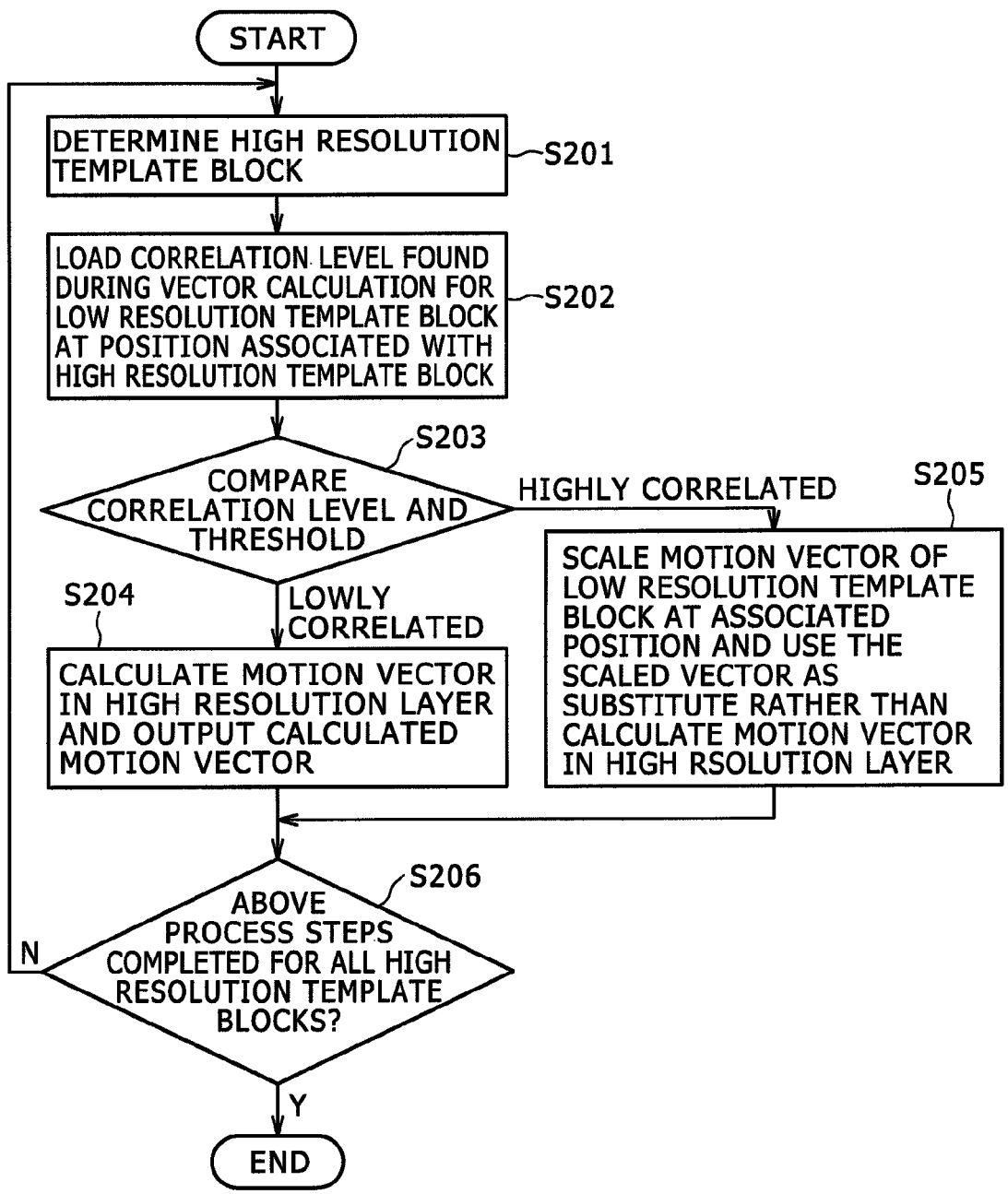
FIG. 11 is a flowchart for describing the process flow in the image processing device according to the second embodiment of the present invention.

A description will be given below of the process flow in the high resolution layer in the second embodiment with reference to the flowchart shown in FIG. 11.

First, a high resolution template block is determined for which a high resolution motion vector is to be found in the high resolution template frame (step S201).

Next, the correlation level associated with the motion vector (low resolution motion vector) of the low resolution template block at the position associated with the determined high resolution template block is obtained from the low resolution motion vector buffer 10 (step S202).

The obtained correlation level is compared with the threshold to determine whether the degree of correlation is high or low between the low resolution reference block associated with the low resolution motion vector and the low resolution template block (step S203). If an SAD value is used as a correlation level, it is determined that the degree of correlation is high when the correlation level is equal to or smaller than the threshold. It is determined that the degree of correlation is low when the correlation level is greater than the threshold.

If it is determined in step S203 that the degree of correlation is low, a motion vector is calculated in the high resolution layer. The found motion vector is output from the motion vector switching section 16 (step S204). The process flow in step S204 is identical in detail to that for the motion vector calculation enclosed by a dashed line in FIG. 8.

On the other hand, if it is determined in step S203 that the degree of correlation is high, a motion vector is not calculated in the high resolution layer. Instead, the low resolution motion vector at the position associated with the high resolution template block is read from the low resolution motion vector buffer 10. Further, the motion vector, obtained by multiplying the low resolution motion vector from the scaling section 15 by the reciprocal of the image reduction ratio, is output from the motion vector switching section 16 (step S205).

After steps S204 and S205, it is determined whether or not the process steps have been completed for all the high resolution template blocks (step S206). If it is determined in step S206 that the process steps have yet to be completed for all the high resolution template blocks, control returns to step S201 where an unprocessed next high resolution template block is set, after which the process steps beyond step S201 are repeated. On the other hand, if it is determined in step S206 that the process steps have been completed for all the high resolution template blocks, this process routine is terminated.

It should be noted that, in the above description, the correlation level associated with the low resolution motion vector was stored in the low resolution motion vector buffer 10 in the second embodiment. Alternatively, however, the correlation may be calculated again between the low resolution template block at the position associated with the high resolution template block and the low resolution reference block rather than storing the correlation level so as to calculate the correlation level associated with the low resolution vector and supply the calculated correlation level to the high resolution layer calculation determination section 14.

Third Embodiment

Figure 12:
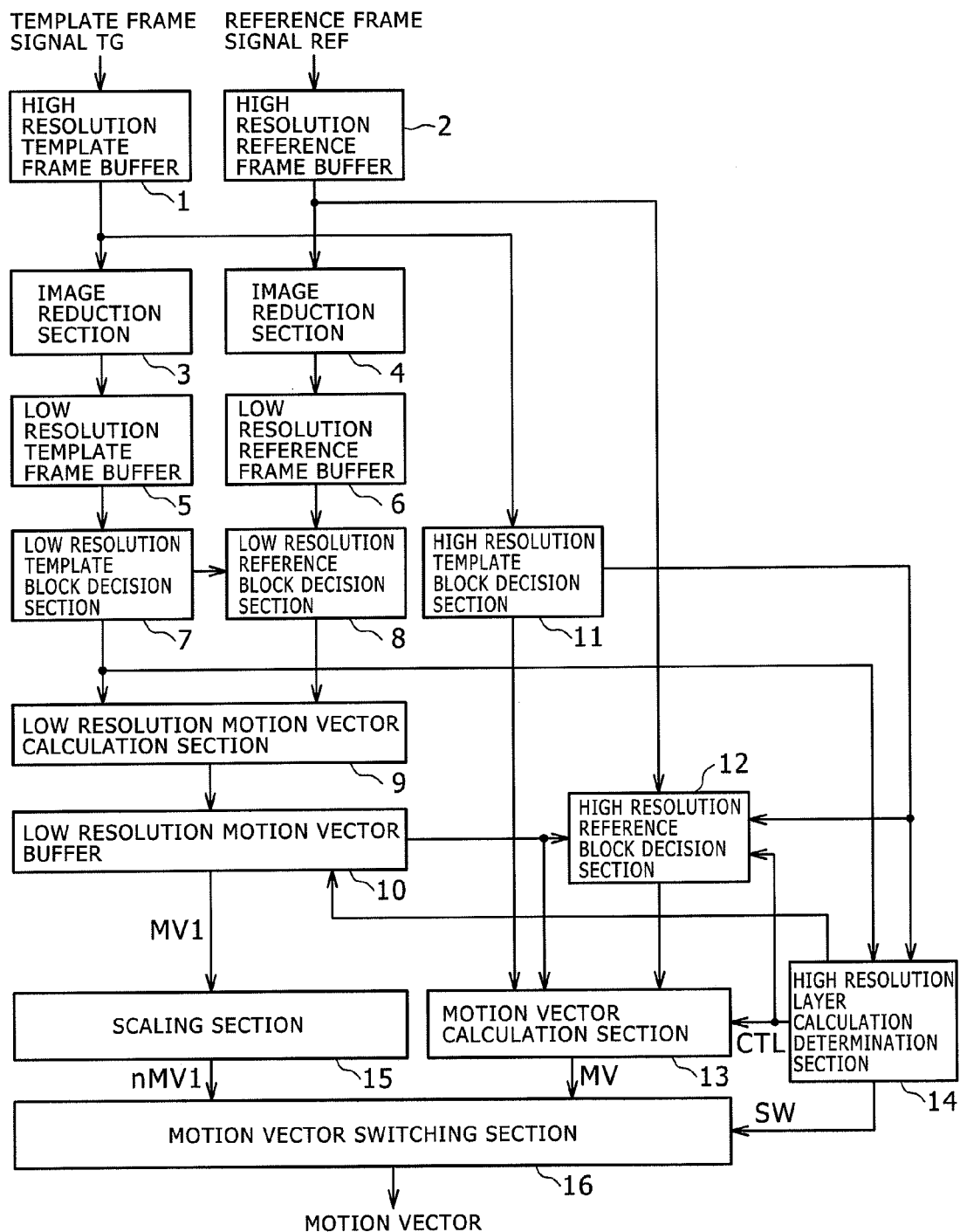
FIG. 12 is a block diagram illustrating an example of hardware configuration of the image processing device according to a third embodiment of the present invention.

FIG. 12 is a block diagram illustrating a configuration example of the major components of the image processing device according to a third embodiment of the present invention. In FIG. 12, like components as those of the image processing device according to the first embodiment shown in FIG. 1 are designated by like reference numerals.

As with the first and second embodiments, the third embodiment also uses only the information in the low resolution layer to determine whether to calculate a motion vector for each of the high resolution template blocks.

In the third embodiment, the high resolution layer calculation determination section 14 calculates an edge magnitude from image information of the low resolution template block at the position associated with the high resolution template block to determine, based on the edge magnitude, whether to calculate a motion vector in the high resolution layer.

If the edge magnitude is large in the image information of the low resolution template block associated with the high resolution template block, the image is complex in content. As a result, it is likely that the motion vector is susceptible to detection error. On the other hand, if the edge magnitude is small in the image information of the low resolution template block associated with the high resolution template block, the image is flat. As a result, it is likely that the motion vector is not susceptible to detection error.

Based on this concept, in the third embodiment, the high resolution layer calculation determination section 14 determines that a motion vector should be calculated in the high resolution layer if the edge magnitude is large in the image information of the low resolution template block associated with the high resolution template block.

On the other hand, the same section 14 determines that the low resolution motion vector should be used as a substitute rather than calculating a motion vector in the high resolution layer if the edge magnitude is small in the image information of the low resolution template block associated with the high resolution template block.

From the above, in the hardware configuration example according to the third embodiment shown in FIG. 12, the high resolution layer calculation determination section 14 does not receive information from the low resolution motion vector buffer 10. Instead, the same section 14 receives image information of the low resolution template block associated with the high resolution template block determined by the high resolution template block decision section 11 by making a request to the low resolution template block decision section 7.

The third embodiment is identical to the first embodiment in all other respects.

In the third embodiment, the high resolution layer calculation determination section 14 uses, for example, a Laplacian filter to find the edge magnitude for each pixel in the low resolution template block. The same section 14 calculates the sum of the edge magnitudes to find the total edge magnitude.

It should be noted that the Laplacian filter can be calculated by convoluting the values, obtained by weighting a brightness level I(x−i,y−i) for a pixel (x−1,y−j) adjacent to a given pixel (x,y) by a coefficient (refer to Equation 4 of FIG. 7). A convolution coefficient matrix a of the Laplacian filter uses, for example, a coefficient as shown in Equation 5 of FIG. 7 with the center of the matrix set as the coordinates of the pixel to be processed.

Figure 13:
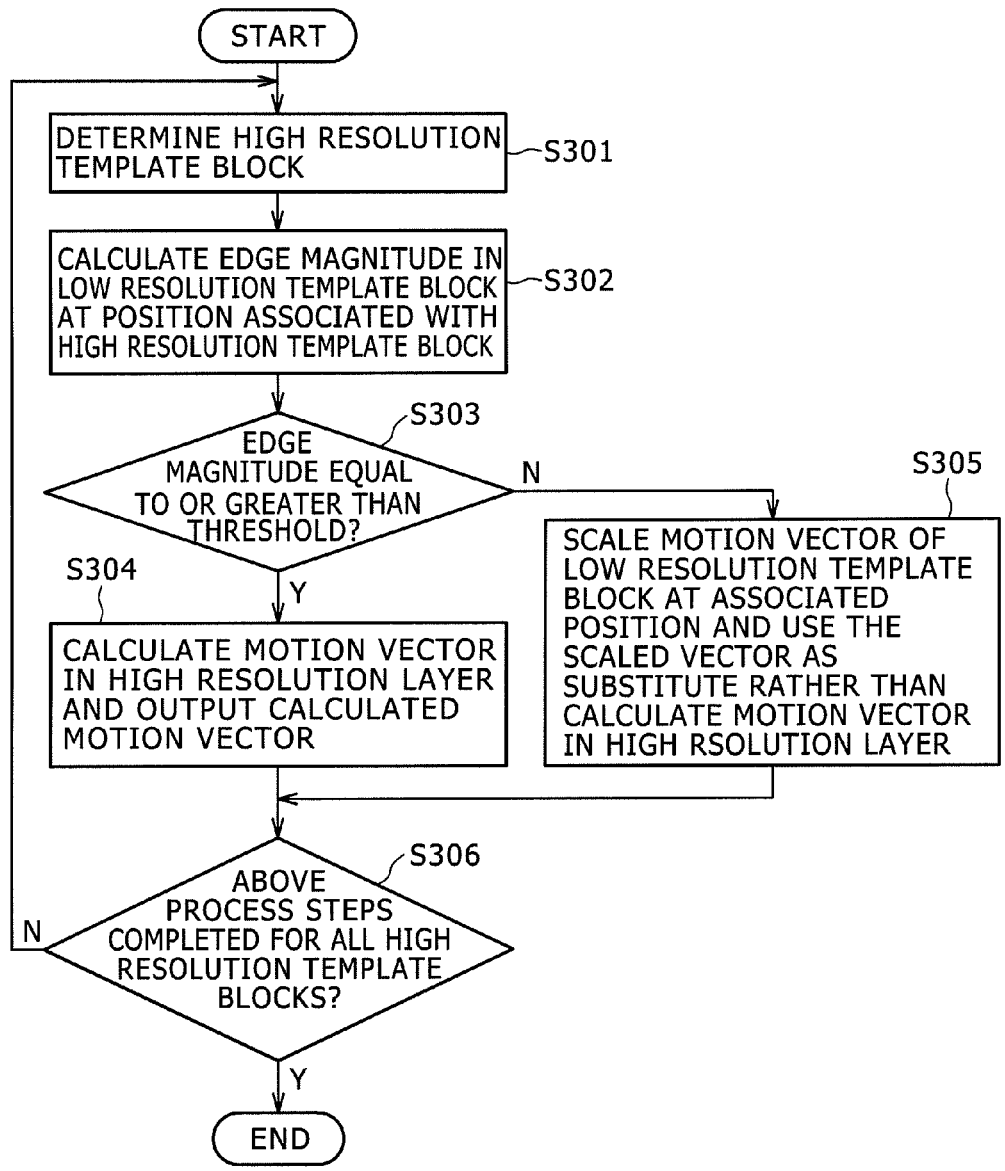
FIG. 13 is a flowchart for describing the process flow in the image processing device according to the third embodiment of the present invention.

A description will be given below of the process flow in the high resolution layer in the third embodiment with reference to the flowchart shown in FIG. 13.

First, a high resolution template block is determined for which a high resolution motion vector is to be found in the high resolution template frame (step S301).

Next, image information of the low resolution template block at the position associated with the determined high resolution template block is obtained to calculate the edge magnitude of the image information in the low resolution template block (step S302).

The calculated edge magnitude is compared with the predetermined threshold to determine whether or not the edge magnitude is equal to or greater than the threshold (step S303).

If it is determined in step S303 that the edge magnitude is equal to or greater than the threshold, a motion vector is calculated in the high resolution layer, and the found motion vector is output from the motion vector switching section 16 (step S304). The process flow in step 304 is identical in detail to that for the motion vector calculation enclosed by a dashed line in FIG. 8.

On the other hand, if it is determined in step S303 that the edge magnitude is smaller than the threshold, a motion vector is not calculated in the high resolution layer. Instead, the low resolution motion vector at the position associated with the high resolution template block is read from the low resolution motion vector buffer 10. Further, the motion vector, obtained by multiplying the low resolution motion vector from the scaling section 15 by the reciprocal of the image reduction ratio, is output from the motion vector switching section 16 (step S305).

After steps S304 and S305, it is determined whether or not the process steps have been completed for all the high resolution template blocks (step S306). If it is determined in step S306 that the process steps have yet to be completed for all the high resolution template blocks, control returns to step S301 where an unprocessed next high resolution template block is set, after which the process steps beyond step S301 are repeated. On the other hand, if it is determined in step S306 that the process steps have been completed for all the high resolution template blocks, this process routine is terminated.

Fourth Embodiment

Figure 14:
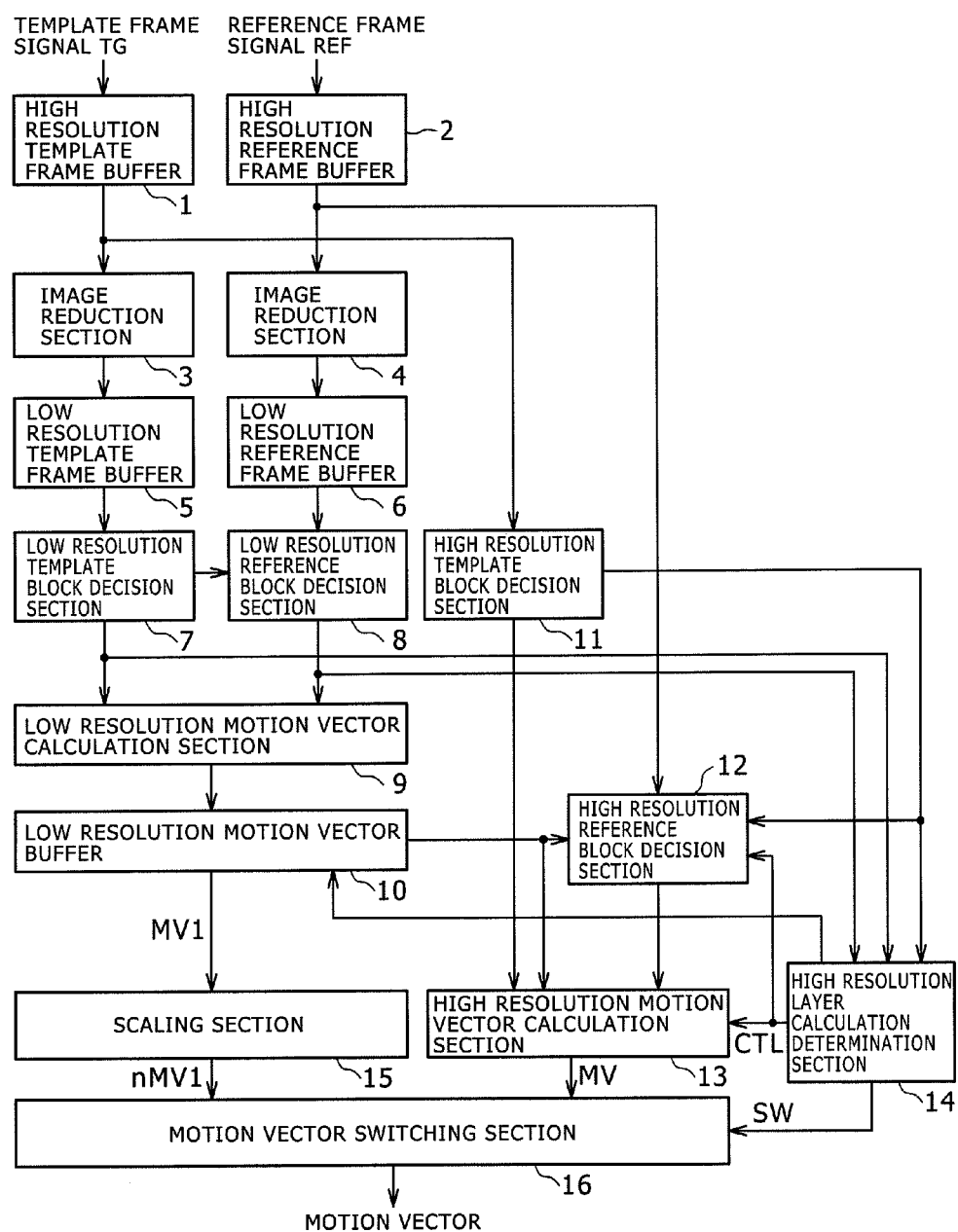
FIG. 14 is a block diagram illustrating an example of hardware configuration of the image processing device according to a fourth embodiment of the present invention.

FIG. 14 is a block diagram illustrating a configuration example of the major components of the image processing device according to a fourth embodiment of the present invention. In FIG. 14, like components as those of the image processing device according to the first embodiment shown in FIG. 1 are designated by like reference numerals.

As with the first to third embodiments, the fourth embodiment also uses only the information in the low resolution layer to determine whether to calculate a motion vector for each of the high resolution template blocks.

In the fourth embodiment, the high resolution layer calculation determination section 14 determines whether to calculate a motion vector in the high resolution layer based on the degree of correlation between the low resolution template block at the position associated with the high resolution template block and the low resolution reference block at the same position.

If the degree of correlation is high between the low resolution template block and the low resolution reference block at the same position, it is likely that only a small motion takes place between two screens and that there is only a slight difference between the final motion vector obtained by using the high resolution motion vector and the low resolution motion vector. On the other hand, if the degree of correlation is low between the low resolution template block and the low resolution reference block at the same position, it is likely that a large motion takes place between two screens and that the final motion vector should be obtained by using the high resolution motion vector.

Based on this concept, in the fourth embodiment, the high resolution layer calculation determination section 14 determines that a motion vector should be calculated in the high resolution layer if the degree of correlation is low between the low resolution template block at the position associated with the high resolution template block and the low resolution reference block at the same position.

On the other hand, the same section 14 determines that the low resolution motion vector should be used as a substitute rather than calculating a motion vector in the high resolution layer if the degree of correlation is high between the low resolution template block at the position associated with the high resolution template block and the low resolution reference block at the same position.

The same section 14 compares the correlation level between the low resolution template block at the position associated with the high resolution template block and the low resolution reference block at the same position with the threshold to determine whether or not the degree of correlation is high.

In the hardware configuration example according to the fourth embodiment shown in FIG. 14, the high resolution layer calculation determination section 14 obtains the low resolution template block at the position associated with the high resolution template block and the low resolution reference block respectively from the low resolution template block decision section 7 and low resolution reference block decision section 8. That is, the same section 14 obtains the position information about the high resolution template block from the high resolution template block decision section 11. The same section 14 obtains the low resolution template block at the associated position and the low resolution reference block by making a request, based on the position information, to the low resolution template block decision section 7 and low resolution reference block decision section 8.

The high resolution layer calculation determination section 14 finds the correlation level between the obtained low resolution template and reference blocks, for example, as an SAD value. The same section 14 compares the found SAD value with the predetermined threshold. The same section 14 determines that the degree of correlation is high when the SAD value is equal to or smaller than the threshold. The same section 14 determines that the degree of correlation is low when the SAD value is greater than the threshold.

The fourth embodiment is identical to the first embodiment in all other respects.

It should be noted that the low resolution motion vector calculation section 9 finds the correlation levels between the low resolution template and reference blocks at the same position in the low resolution template and reference frames in some cases. Therefore, a holding buffer is provided in the same section 9 so that the correlation levels therebetween are stored in the same buffer. This makes it possible for the same section 9 to supply the correlation level for the associated position to the high resolution layer calculation determination section 14 upon request from the same section 14 accompanied by position information.

It should be noted, however, that if the magnitude of the motion vector is large, the correlation level between the low resolution template and reference blocks is not calculated. As a result, the associated correlation level may not exist in the holding buffer of the low resolution motion vector calculation section 9. In this case, the high resolution layer calculation determination section 14 must obtain the low resolution template and reference blocks at the same position as described earlier and calculate the correlation level therebetween.

Figure 15:
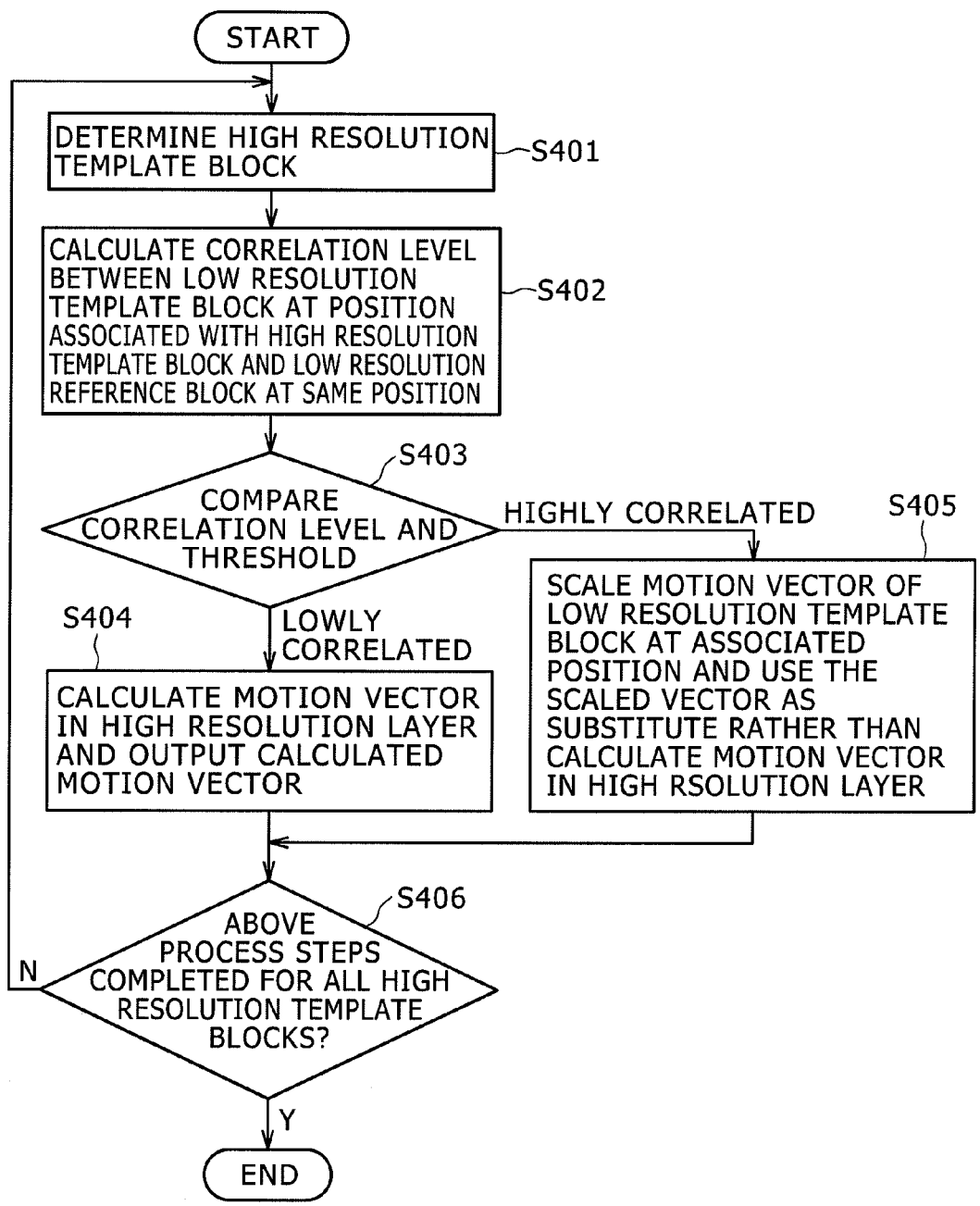
FIG. 15 is a flowchart for describing the process flow in the image processing device according to the fourth embodiment of the present invention.

A description will be given below of the process flow in the high resolution layer in the fourth embodiment with reference to the flowchart shown in FIG. 15.

First, a high resolution template block is determined for which a high resolution motion vector is to be found in the high resolution template frame (step S401).

Next, image information of the low resolution template block at the position associated with the determined high resolution template block and that of the low resolution reference block at the same position are obtained to calculate the correlation level between the low resolution template and reference blocks (step S402).

The obtained correlation level is compared with the threshold to determine whether the degree of correlation is high or low between the low resolution template block and the low resolution reference block at the same position (step S403). If an SAD value is used as a correlation level, it is determined that the degree of correlation is high when the correlation level is equal to or smaller than the threshold. It is determined that the degree of correlation is low when the correlation level is greater than the threshold.

If it is determined in step S403 that the degree of correlation is low, a motion vector is calculated in the high resolution layer, and the found motion vector is output from the motion vector switching section 16 (step S404). The process flow in step 404 is identical in detail to that for the motion vector calculation enclosed by a dashed line in FIG. 8.

On the other hand, if it is determined in step S403 that the degree of correlation is high, a motion vector is not calculated in the high resolution layer. Instead, the low resolution motion vector at the position associated with the high resolution template block is read from the low resolution motion vector buffer 10. Further, the motion vector, obtained by multiplying the low resolution motion vector from the scaling section 15 by the reciprocal of the image reduction ratio, is output from the motion vector switching section 16 (step S405).

After steps S404 and S405, it is determined whether the process steps have been completed for all the high resolution template blocks (step S406). If it is determined in step S406 that the process steps have yet to be completed for all the high resolution template blocks, control returns to step S401 where an unprocessed next high resolution template block is set, after which the process steps beyond step S401 are repeated. On the other hand, if it is determined in step S406 that the process steps have been completed for all the high resolution template blocks, this process routine is terminated.

A description will be given next of the embodiments for determining whether to calculate a motion vector in the high resolution layer using information in the high resolution layer. In this case, the use of information in the high resolution layer provides high accuracy in the determination as to whether to calculate a motion vector in the high resolution layer.

Fifth Embodiment

Figure 16:
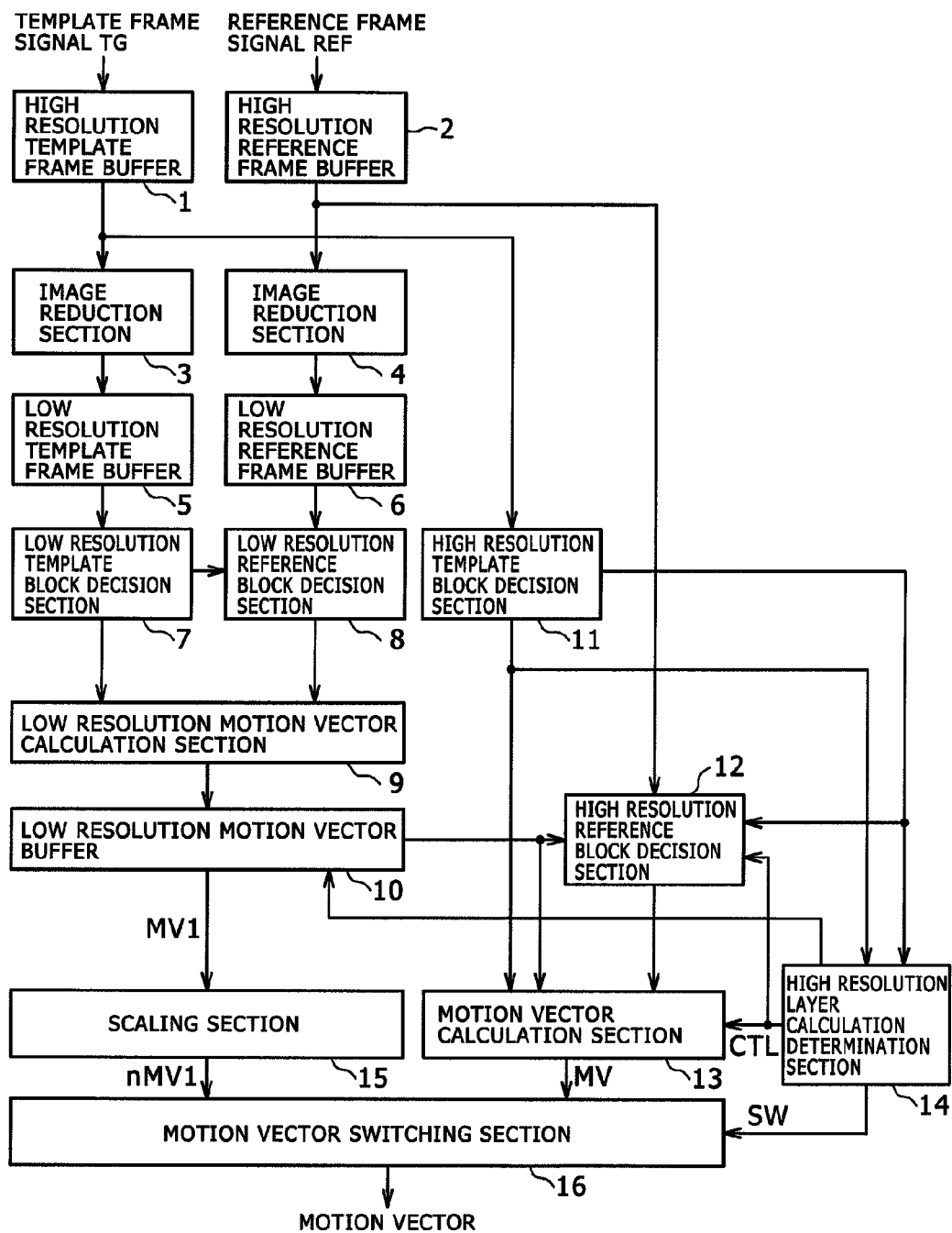
FIG. 16 is a block diagram illustrating an example of hardware configuration of the image processing device according to a fifth embodiment of the present invention.

FIG. 16 is a block diagram illustrating a configuration example of the major components of the image processing device according to a fifth embodiment of the present invention. In FIG. 16, like components as those of the image processing device according to the first embodiment shown in FIG. 1 are designated by like reference numerals.

The fifth embodiment is achieved by applying the concept of the third embodiment to the case in which information in the high resolution layer is used.

In the fifth embodiment, the high resolution layer calculation determination section 14 calculates an edge magnitude in the image information of the high resolution template block to determine, based on the edge magnitude, whether to calculate a motion vector in the high resolution layer.

That is, in the fifth embodiment, the same section 14 determines that a motion vector should be calculated in the high resolution layer if the edge magnitude is large in the image information of the high resolution template block.

On the other hand, the same section 14 determines that the low resolution motion vector should be used as a substitute rather than calculating a motion vector in the high resolution layer if the edge magnitude is small in the image information of the high resolution template block.

In the hardware configuration example according to the fifth embodiment shown in FIG. 16, the high resolution layer calculation determination section 14 obtains image information of the high resolution template block from the high resolution template block decision section 11.

The fifth embodiment is identical to the first embodiment in all other respects.

As with the high resolution layer calculation determination section 14 according to the third embodiment, the same section 14 according to the fifth embodiment uses, for example, a Laplacian filter to find the edge magnitude for each pixel in the low resolution template block. The same section 14 calculates the sum of the edge magnitudes to find the total edge magnitude.

Figure 17:
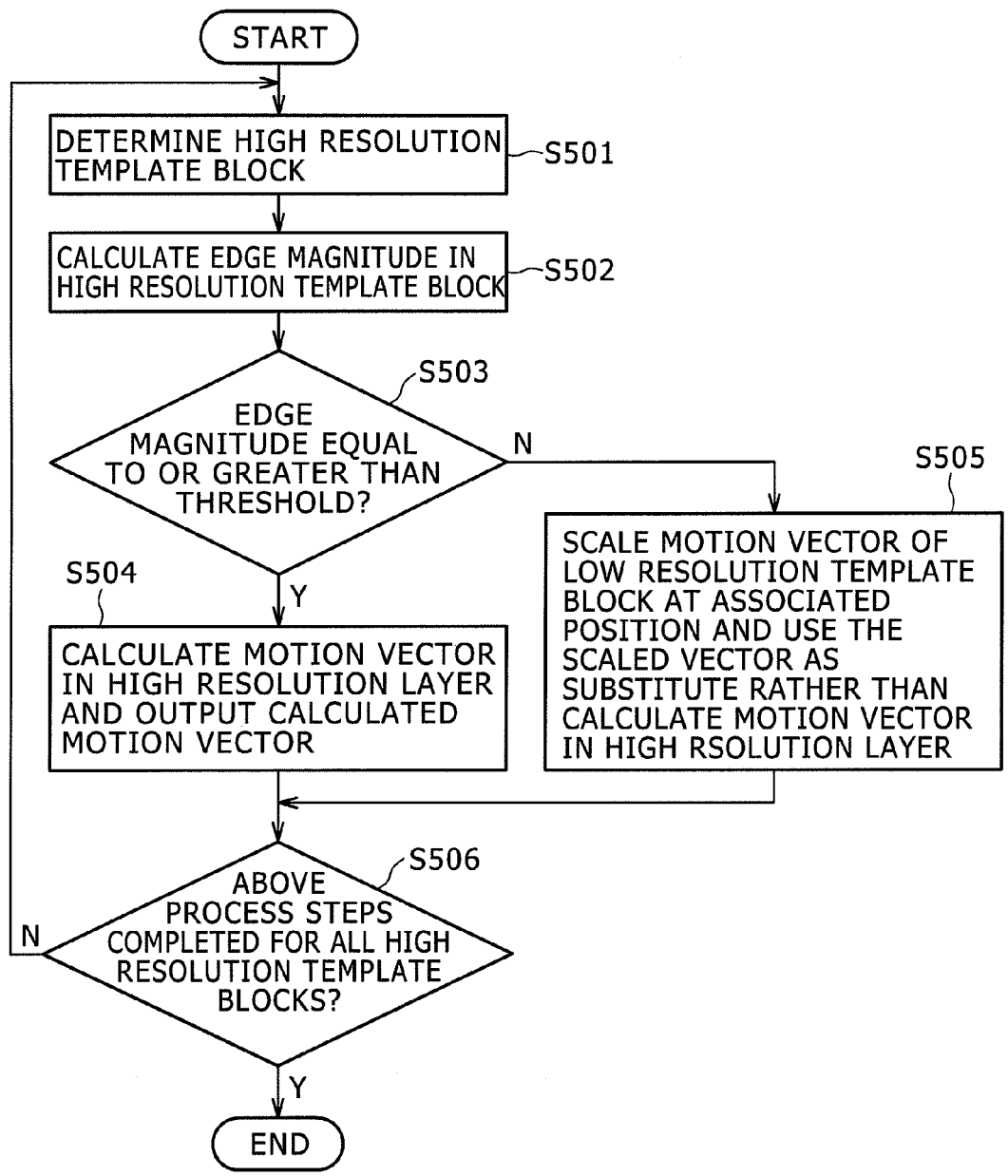
FIG. 17 is a flowchart for describing the process flow in the image processing device according to the fifth embodiment of the present invention.

A description will be given below of the process flow in the high resolution layer in the fifth embodiment with reference to the flowchart shown in FIG. 17.

First, a high resolution template block is determined for which a high resolution motion vector is to be found in the high resolution template frame (step S501).

Next, image information of the determined high resolution template block is obtained to calculate the edge magnitude in the image information of the high resolution template block (step S502).

The calculated edge magnitude is compared with the predetermined threshold to determine whether the edge magnitude is equal to or greater than the threshold (step S503).

If it is determined in step S503 that the edge magnitude is equal to or greater than the threshold, a motion vector is calculated in the high resolution layer, and the found motion vector is output from the motion vector switching section 16 (step S504). The process flow in step 504 is identical in detail to that for the motion vector calculation enclosed by a dashed line in FIG. 8.

On the other hand, if it is determined in step S503 that the edge magnitude is smaller than the threshold, a motion vector is not calculated in the high resolution layer. Instead, the low resolution motion vector at the position associated with the high resolution template block is read from the low resolution motion vector buffer 10. Further, the motion vector, obtained by multiplying the low resolution motion vector from the scaling section 15 by the reciprocal of the image reduction ratio, is output from the motion vector switching section 16 (step S505).

After steps S504 and S505, it is determined whether the process steps have been completed for all the high resolution template blocks (step S506). If it is determined in step S506 that the process steps have yet to be completed for all the high resolution template blocks, control returns to step S501 where an unprocessed next high resolution template block is set, after which the process steps beyond step S501 are repeated. On the other hand, if it is determined in step S506 that the process steps have been completed for all the high resolution template blocks, this process routine is terminated.

Sixth Embodiment

Figure 18:
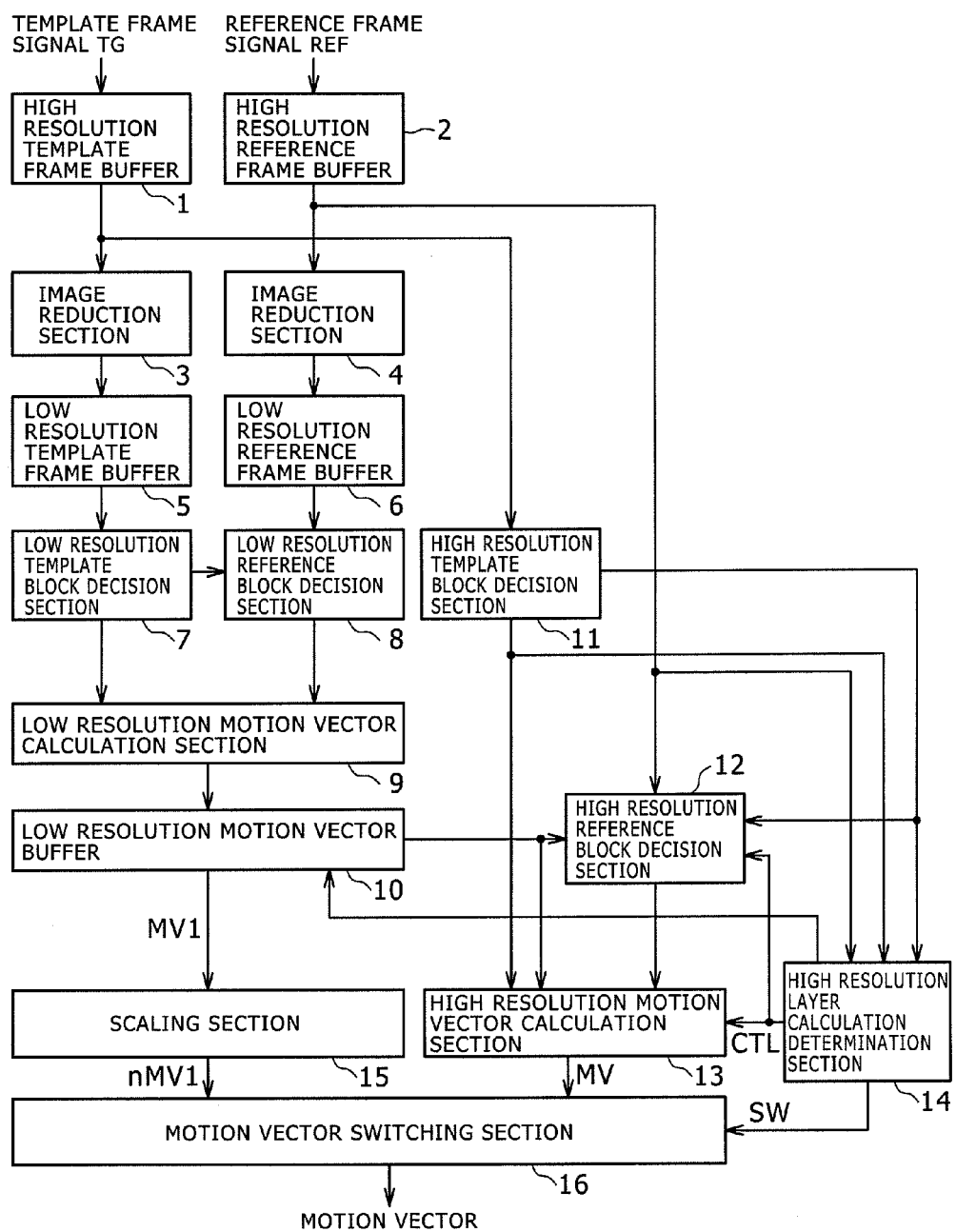
FIG. 18 is a block diagram illustrating an example of hardware configuration of the image processing device according to a sixth embodiment of the present invention.

FIG. 18 is a block diagram illustrating a configuration example of the major components of the image processing device according to a sixth embodiment of the present invention. In FIG. 18, like components as those of the image processing device according to the first embodiment shown in FIG. 1 are designated by like reference numerals.

The sixth embodiment is achieved by applying the concept of the fourth embodiment to the case in which information in the high resolution layer is used.

In the sixth embodiment, the high resolution layer calculation determination section 14 determines whether to calculate a motion vector in the high resolution layer based on the degree of correlation between the high resolution template block and the high resolution reference block at the same position.

If the degree of correlation is high between the high resolution template block and the high resolution reference block at the same position, it is likely that only a small motion takes place between two screens and that there is only a slight difference between the final motion vector obtained by the layered process and the low resolution motion vector.

On the other hand, if the degree of correlation is low between the high resolution template block and the high resolution reference block at the same position, it is likely that a large motion takes place between two screens and that the final motion vector should be obtained by detecting the high resolution motion vector by means of the layered process.

Based on this concept, in the sixth embodiment, the high resolution layer calculation determination section 14 determines that a motion vector should be calculated in the high resolution layer if the degree of correlation is low between the high resolution template block and the high resolution reference block at the same position.

On the other hand, the same section 14 determines that the low resolution motion vector should be used as a substitute rather than calculating a motion vector in the high resolution layer if the degree of correlation is high between the high resolution template block and the high resolution reference block at the same position.

The same section 14 compares the correlation level between the high resolution template block and the high resolution reference block at the same position with the threshold to determine whether or not the degree of correlation is high.

In the hardware configuration example according to the sixth embodiment shown in FIG. 18, the high resolution layer calculation determination section 14 obtains image information of the high resolution template block as an output of the high resolution template block decision section 11. Further, the same section 14 accesses the high resolution reference frame buffer 2 based on the position information about the high resolution template block from the same section 11 to obtain image information of the high resolution reference block at the same position.

Next, the same section 14 finds the correlation level between the obtained high resolution template and reference blocks, for example, as an SAD value using the obtained image information. Finally, the same section 14 compares the found SAD value with the predetermined threshold. The same section 14 determines that the degree of correlation is high when the SAD value is equal to or smaller than the threshold. The same section 14 determines that the degree of correlation is low when the SAD value is greater than the threshold.

The sixth embodiment is identical to the first embodiment in all other respects.

Figure 19:
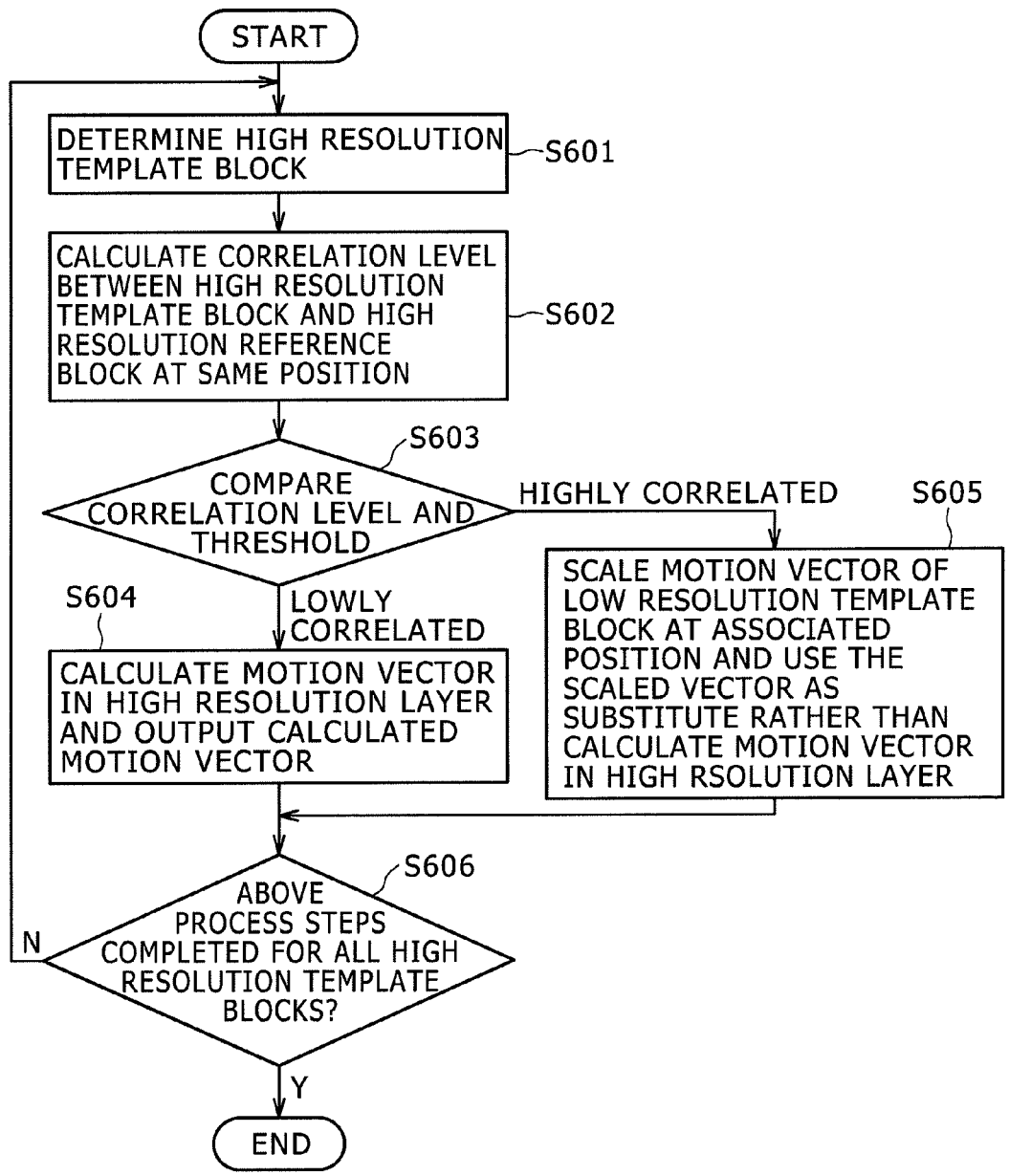
FIG. 19 is a flowchart for describing the process flow in the image processing device according to the sixth embodiment of the present invention.

A description will be given below of the process flow in the high resolution layer in the sixth embodiment with reference to the flowchart shown in FIG. 19.

First, a high resolution template block is determined for which a high resolution motion vector is to be found in the high resolution template frame (step S601).

Next, image information of the high resolution template block and that of the high resolution reference block at the same position are obtained to calculate the correlation level between the high resolution template and reference blocks (step S602).

The obtained correlation level is compared with the threshold to determine whether the degree of correlation is high or low between the high resolution template block and the high resolution reference block at the same position (step S603). If an SAD value is used as a correlation level, it is determined that the degree of correlation is high when the correlation level is equal to or smaller than the threshold. It is determined that the degree of correlation is low when the correlation level is greater than the threshold.

If it is determined in step S603 that the degree of correlation is low, a motion vector is calculated in the high resolution layer, and the found motion vector is output from the motion vector switching section 16 (step S604). The process flow in step 604 is identical in detail to that for the motion vector calculation enclosed by a dashed line in FIG. 8.

On the other hand, if it is determined in step S603 that the degree of correlation is high, a motion vector is not calculated in the high resolution layer. Instead, the low resolution motion vector at the position associated with the high resolution template block is read from the low resolution motion vector buffer 10. Further, the motion vector, obtained by multiplying the low resolution motion vector from the scaling section 15 by the reciprocal of the image reduction ratio, is output from the motion vector switching section 16 (step S605).

After steps S604 and S605, it is determined whether or not the process steps have been completed for all the high resolution template blocks (step S606). If it is determined in step S606 that the process steps have yet to be completed for all the high resolution template blocks, control returns to step S601 where an unprocessed next high resolution template block is set, after which the process steps beyond step S601 are repeated. On the other hand, if it is determined in step S606 that the process steps have been completed for all the high resolution template blocks, this process routine is terminated.

A description will be given next of the embodiments for determining whether or not to calculate a motion vector in the high resolution layer using information in the low and high resolution layers.

Seventh Embodiment

Figure 20:
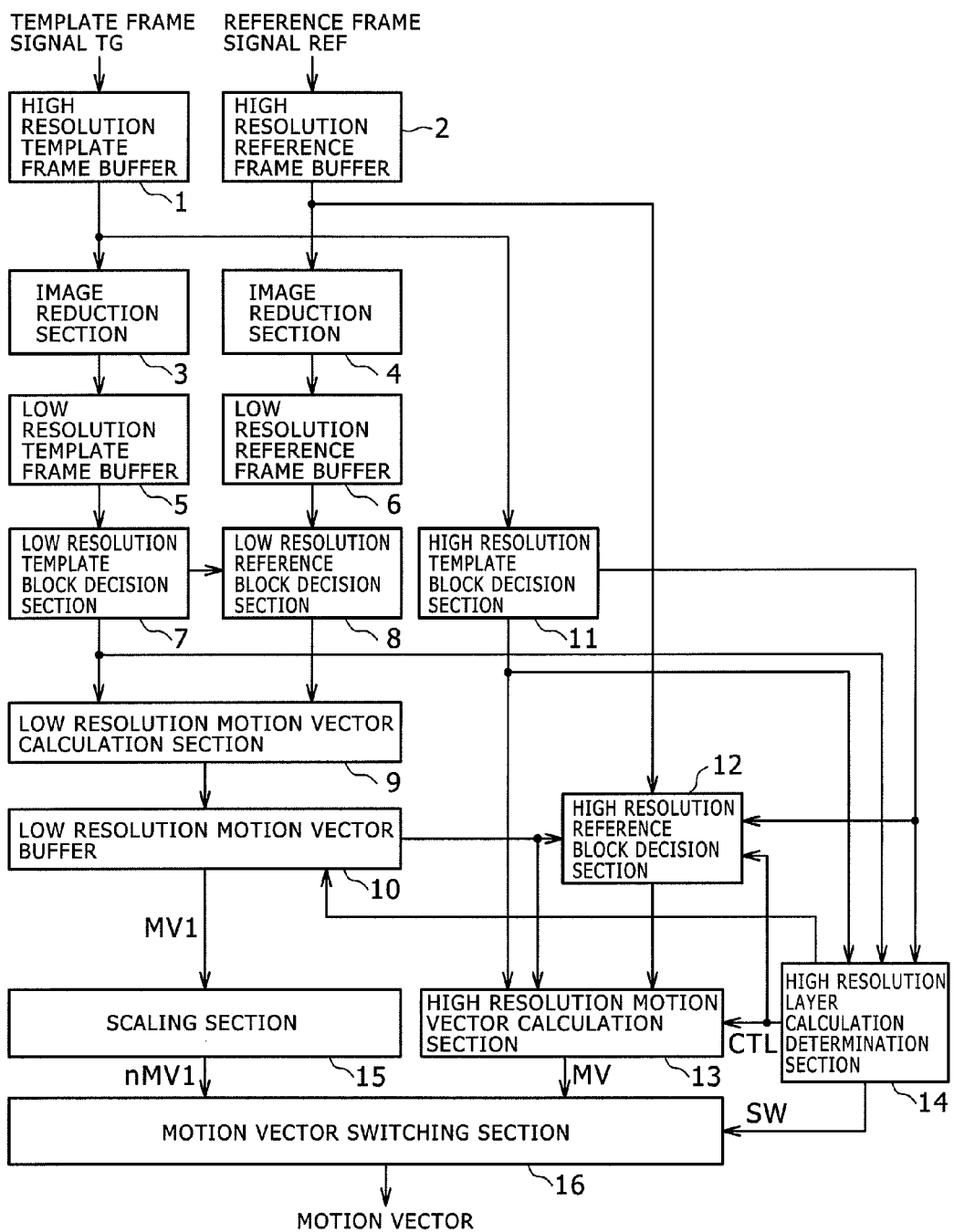
FIG. 20 is a block diagram illustrating an example of hardware configuration of the image processing device according to a seventh embodiment of the present invention.

FIG. 20 is a block diagram illustrating a configuration example of the major components of the image processing device according to a seventh embodiment of the present invention. In FIG. 20, like components as those of the image processing device according to the first embodiment shown in FIG. 1 are designated by like reference numerals.

In the seventh embodiment, the high resolution layer calculation determination section 14 determines whether to calculate a motion vector in the high resolution layer based on the degree of correlation between the high resolution template block and the low resolution template block at the position associated therewith.

A high degree of correlation between the high resolution template block and the low resolution template block at the same position means that the degree of correlation is high between the original image and the image obtained by reducing the original one. It is likely that this means that the image in the block is relatively flat with little change. In such a case, it is likely that there is only a slight difference between the final motion vector obtained by the layered process and the low resolution motion vector.

Based on this concept, in the seventh embodiment, the high resolution layer calculation determination section 14 determines that a motion vector should be calculated in the high resolution layer if the degree of correlation is low between the high resolution template block and the low resolution template block at the position associated therewith.

On the other hand, the same section 14 determines that the low resolution motion vector should be used as a substitute rather than calculating a motion vector in the high resolution layer if the degree of correlation is high between the high resolution template block and the low resolution template block at the position associated therewith.

The same section 14 compares the correlation level between the high resolution template block and the low resolution template block at the position associated therewith the threshold to determine whether or not the degree of correlation is high.

In the hardware configuration example according to the seventh embodiment shown in FIG. 20, the high resolution layer calculation determination section 14 obtains image information of the high resolution template block as an output of the high resolution template block decision section 11. Further, the same section 14 obtains image information of the low resolution template block at the position associated with the high resolution template block from the low resolution template block decision section 7. That is, the same section 14 obtains the low resolution template block at the associated position by making a request to the low resolution template block decision section 7 based on the position information of the high resolution template block obtained from the high resolution template block decision section 11.

Next, the same section 14 finds the correlation level between the obtained high and low resolution template blocks, for example, as an SAD value. Finally, the same section 14 compares the found SAD value with the predetermined threshold. The same section 14 determines that the degree of correlation is high when the SAD value is equal to or smaller than the threshold. The same section 14 determines that the degree of correlation is low when the SAD value is greater than the threshold.

The seventh embodiment is identical to the first embodiment in all other respects.

Figure 21:
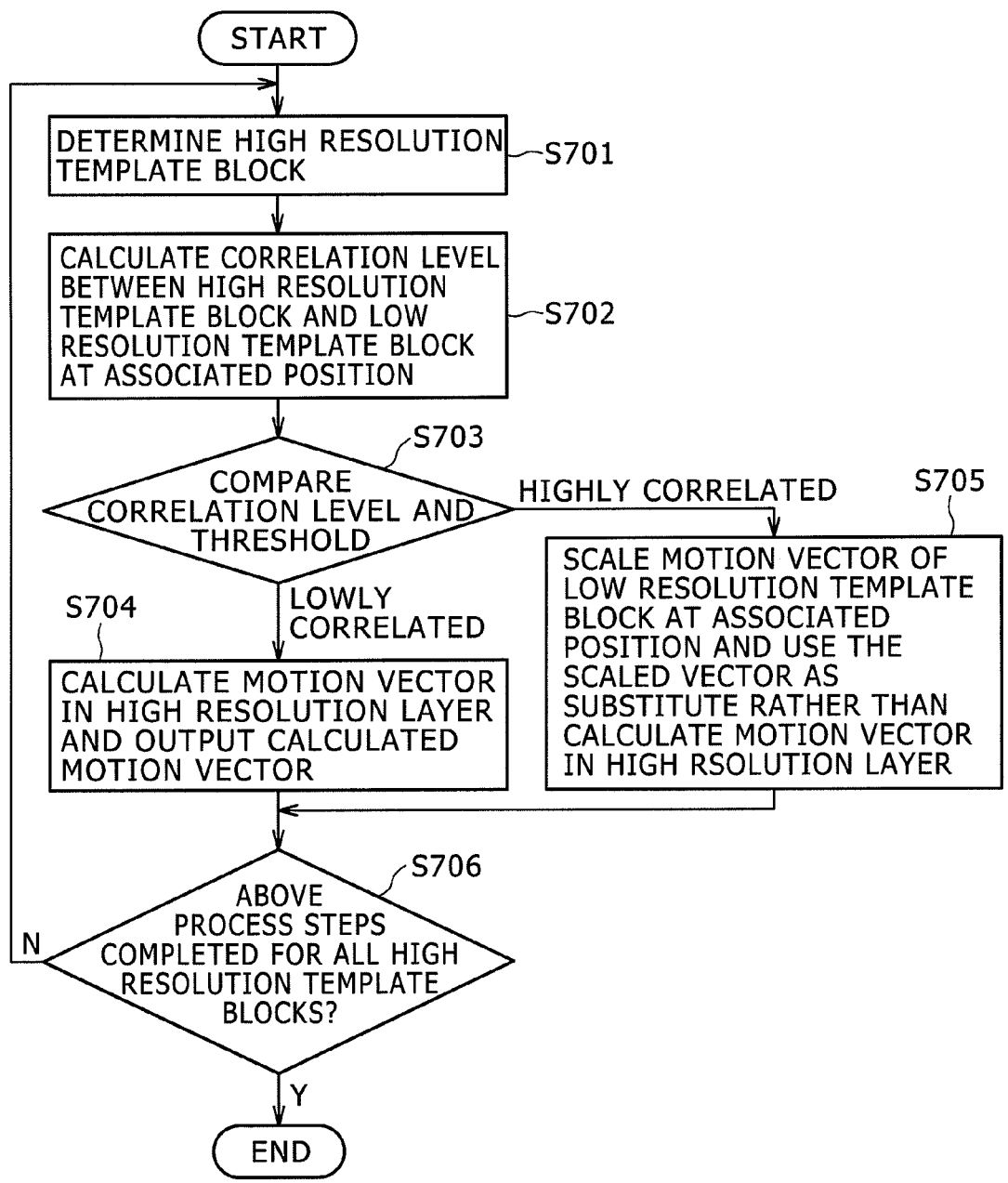
FIG. 21 is a flowchart for describing the process flow in the image processing device according to the seventh embodiment of the present invention.

A description will be given below of the process flow in the high resolution layer in the seventh embodiment with reference to the flowchart shown in FIG. 21.

First, a high resolution template block is determined for which a high resolution motion vector is to be found in the high resolution template frame (step S701).

Next, image information of the high resolution template block and that of the low resolution template block at the position associated therewith are obtained to calculate the correlation level between the high and low resolution template blocks (step S702).

The obtained correlation level is compared with the threshold to determine whether the degree of correlation is high or low between the high resolution template block and the low resolution template block at the same position associated therewith (step S703). If an SAD value is used as a correlation level, it is determined that the degree of correlation is high when the correlation level is equal to or smaller than the threshold. It is determined that the degree of correlation is low when the correlation level is greater than the threshold.

If it is determined in step S703 that the degree of correlation is low, a motion vector is calculated in the high resolution layer, and the found motion vector is output from the motion vector switching section 16 (step S704). The process flow in step 704 is identical in detail to that for the motion vector calculation enclosed by a dashed line in FIG. 8.

On the other hand, if it is determined in step S703 that the degree of correlation is high, a motion vector is not calculated in the high resolution layer. Instead, the low resolution motion vector at the position associated with the high resolution template block is read from the low resolution motion vector buffer 10. Further, the motion vector, obtained by multiplying the low resolution motion vector from the scaling section 15 by the reciprocal of the image reduction ratio, is output from the motion vector switching section 16 (step S705).

After steps S704 and S705, it is determined whether or not the process steps have been completed for all the high resolution template blocks (step S706). If it is determined in step S706 that the process steps have yet to be completed for all the high resolution template blocks, control returns to step S701 where an unprocessed next high resolution template block is set, after which the process steps beyond step S701 are repeated. On the other hand, if it is determined in step S706 that the process steps have been completed for all the high resolution template blocks, this process routine is terminated.

Modification Example of the Seventh Embodiment

In the seventh embodiment described above, it is determined whether to calculate a motion vector in the high resolution layer based on the degree of correlation between the high resolution template block and the low resolution template block at the position associated therewith. In contrast, if the concept of the fourth embodiment is applied to the case in which information in the low and high resolution layers is used, the degree of correlation may be found between the high resolution template block and the low resolution reference block at the position associated therewith.

That is, it may be determined whether to calculate a motion vector in the high resolution layer based on the degree of correlation between the high resolution template block and the low resolution reference block at the position associated therewith.

Eighth Embodiment

Figure 22:
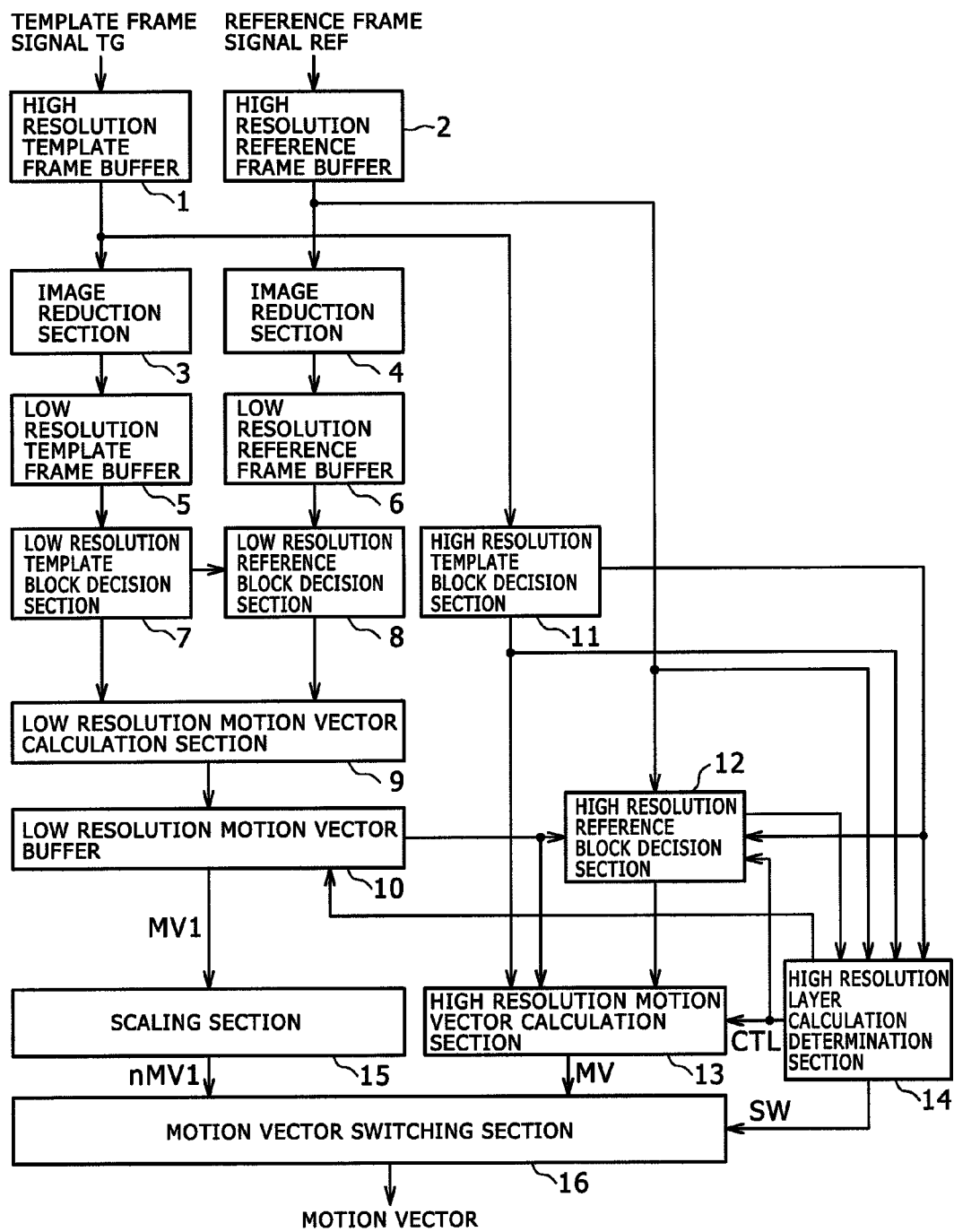
FIG. 22 is a block diagram illustrating an example of hardware configuration of the image processing device according to an eighth embodiment of the present invention.

FIG. 22 is a block diagram illustrating a configuration example of the major components of the image processing device according to an eighth embodiment of the present invention. In FIG. 22, like components as those of the image processing device according to the first embodiment shown in FIG. 1 are designated by like reference numerals.

As described earlier, the high resolution reference block decision section 12 obtains the motion vector of the low resolution template block at the position associated with the high resolution template block from the low resolution motion vector buffer 10. Next, the same section 12 identifies the position indicated by the motion vector which is obtained by multiplying the low resolution motion vector by the reciprocal of the image reduction ratio. Then, the same section 12 sets a search area in the high resolution reference frame. The same area is centered at the position indicated by the motion vector.

In the eighth embodiment, the high resolution layer calculation determination section 14 obtains position information of the high resolution reference block having its center at the position indicated by the motion vector of the low resolution template block by making a request to the high resolution reference block decision section 12. The high resolution reference block at this position will be hereinafter referred to as the determination high resolution reference block.

The same section 14 obtains image information of the determination high resolution reference block from the high resolution reference frame buffer 2 using the obtained position information. Further, the same section 14 obtains image information of the high resolution template block from the high resolution template block decision section 11.

Then, in the eighth embodiment, the same section 14 finds the degree of correlation between the high resolution template block and determination high resolution reference block. The same section 14 determines whether to calculate a motion vector in the high resolution layer based on the degree of correlation therebetween.

That is, in the eighth embodiment, the same section 14 determines that a motion vector need not be calculated in the high resolution layer if the degree of correlation is high between the determination high resolution reference block and high resolution template block. On the other hand, the same section 14 determines that a motion vector should be calculated in the high resolution layer if the degree of correlation is low between the determination high resolution reference block and high resolution template block.

Also, in the eighth embodiment, the correlation level is found between the high resolution template block and determination high resolution reference block. Then, the found correlation level is compared with the threshold to determine whether or not the degree of correlation is high therebetween. In this example, an SAD value is also used as a correlation level.

The eighth embodiment is identical to the first embodiment in all other respects.

It should be noted that, in the eighth embodiment, even if a motion vector is not calculated in the high resolution layer, the high resolution reference block decision section 12 determines a determination high resolution reference block. However, the same section 12 can be deactivated as in the above embodiments if the task of determining a determination high resolution reference block is handled by the high resolution layer calculation determination section 14 and if a motion vector is not calculated in the high resolution layer.

Figure 23:
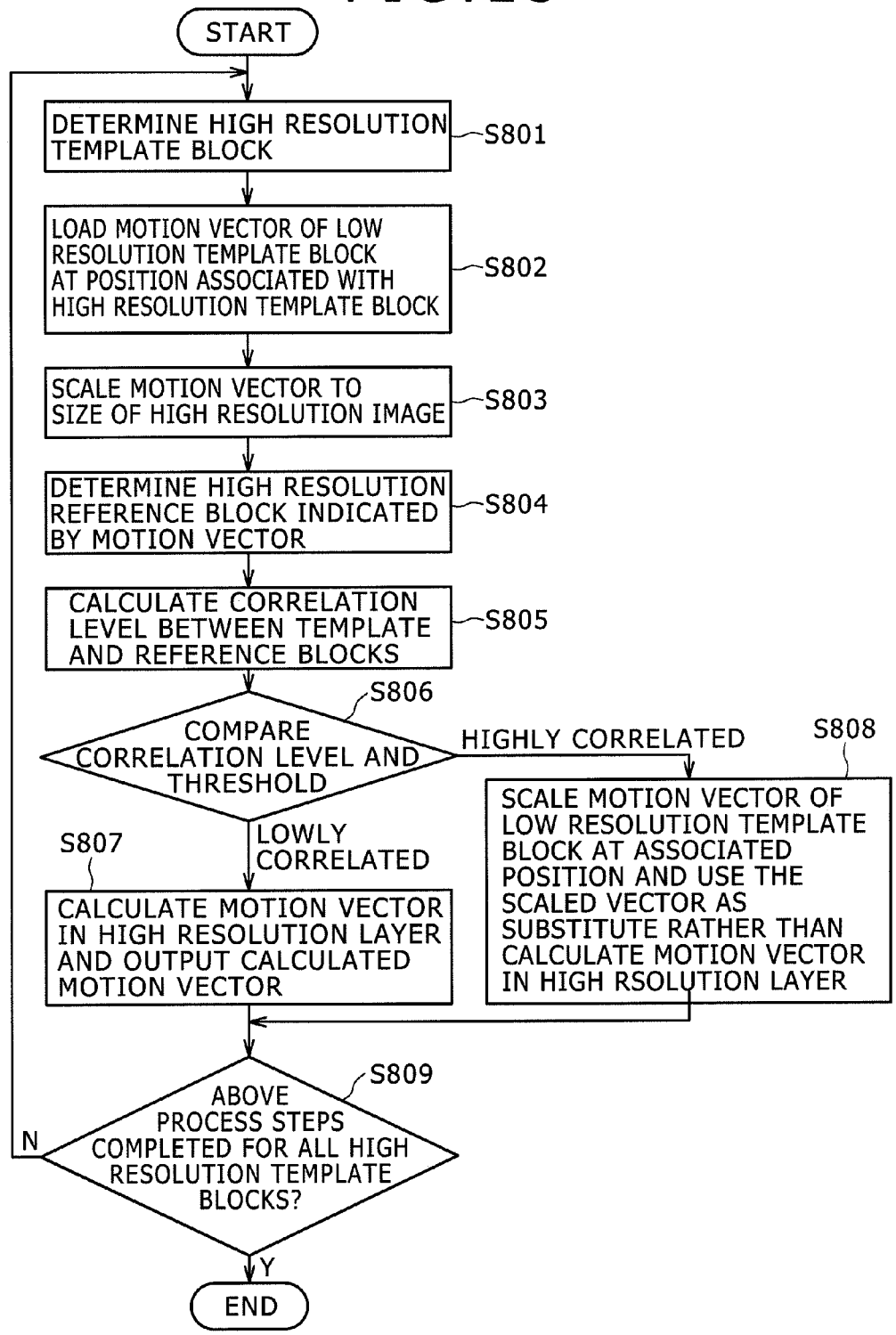
FIG. 23 is a flowchart for describing the process flow in the image processing device according to the eighth embodiment of the present invention.

A description will be given below of the process flow in the high resolution layer in the eighth embodiment with reference to the flowchart shown in FIG. 23.

First, a high resolution template block is determined for which a high resolution motion vector is to be found in the high resolution template frame (step S801).

Next, the motion vector of the low resolution template block at the position associated with the determined high resolution template block is loaded (obtained) from the low resolution motion vector buffer 10 (step S802).

Next, the obtained the motion vector of the low resolution template block at the position associated with the high resolution template block is multiplied by the reciprocal of the image reduction ratio to scale the motion vector to the size appropriate to the high resolution image (step S803).

Next, the high resolution reference block indicated by the scaled motion vector, i.e., the determination high resolution reference block, is determined in the high resolution reference frame (step S804).

The correlation level is calculated between the high resolution template block and determination high resolution reference block using the image information of the high resolution template block obtained in step S801 and that of the determination high resolution reference block obtained in step S804 (step S805).

The found correlation level is compared with the threshold to determine whether the degree of correlation is high or low between the high resolution template block and determination high resolution reference block (step S806). If an SAD value is used as a correlation level, it is determined that the degree of correlation is high when the correlation level is equal to or smaller than the threshold. It is determined that the degree of correlation is low when the correlation level is greater than the threshold.

If it is determined in step S806 that the degree of correlation is low, a motion vector is calculated in the high resolution layer, and the found motion vector is output from the motion vector switching section 16 (step S807). The process flow in step 807 is identical in detail to that for the motion vector calculation enclosed by a dashed line in FIG. 8.

On the other hand, if it is determined in step S806 that the degree of correlation is high, a motion vector is not calculated in the high resolution layer. Instead, the low resolution motion vector at the position associated with the high resolution template block is read from the low resolution motion vector buffer 10. Further, the motion vector, obtained by multiplying the low resolution motion vector from the scaling section 15 by the reciprocal of the image reduction ratio, is output from the motion vector switching section 16 (step S808).

After steps S807 and S808, it is determined whether or not the process steps have been completed for all the high resolution template blocks (step S809). If it is determined in step S809 that the process steps have yet to be completed for all the high resolution template blocks, control returns to step S801 where an unprocessed next high resolution template block is set, after which the process steps beyond step S801 are repeated. On the other hand, if it is determined in step S809 that the process steps have been completed for all the high resolution template blocks, this process routine is terminated.

Other Embodiments and Modification Examples

In the embodiments described above, if a motion vector is determined not to be calculated in the high resolution layer, the low resolution motion vector found in the low resolution layer is multiplied in an as-is manner by the reciprocal of the image reduction ratio and output.

However, the above-described block matching method performs block matching on a pixel-by-pixel basis. As a result, a motion vector can be calculated with one pixel accuracy. Therefore, a low resolution motion vector found in the low resolution layer provides only one pixel accuracy in a low resolution image.

In contrast, it is possible to calculate a highly accurate or sub-pixel-accuracy low resolution motion vector in the following manner. A description will be given below of how to calculate a highly accurate, sub-pixel-accuracy low resolution motion vector.

The low resolution motion vector calculation section 9 places low resolution reference blocks in a search area and moves the blocks one pixel at a time for block matching. The same section 9 finds the correlation level between the low resolution reference blocks at positions that differ by one pixel and the template block and prepares a table of the found correlation levels.

The same section 9 detects the position of the low resolution reference block having the highest degree of correlation with the low resolution template block from the table of the correlation levels found for all the low resolution reference blocks in the search area. The same section 9 detects the low resolution reference vector associated with that position as the low resolution motion vector.

If an SAD value is used as a correlation level, the above table is referred to as an SAD value table.

Here, we consider calculating a sub-pixel-accuracy motion vector from an SAD value table obtained by a pixel-by-pixel matching process. This matching process is achieved by interpolating the SAD value table using a quadratic curve. In this case, linear interpolation or cubic or higher order approximation/interpolation may be used rather than using quadratic approximation/interpolation. In this example, however, quadratic approximation/interpolation is performed because of a tradeoff between accuracy and hardware implementation.

Figure 24:
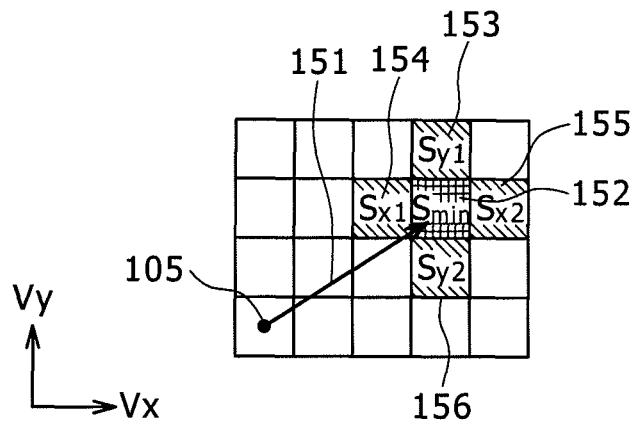
FIG. 24 is a diagram for describing the image processing device according to another embodiment of the present invention.

In the quadratic approximation/interpolation, a minimum SAD value 5 min in the SAD value table indicated by the one-pixel-accuracy motion vector 151 (refer to reference numeral 152 in FIG. 24) and a plurality of SAD values adjacent to the minimum value 5 min are used.

Here, the plurality of SAD values adjacent to the minimum value 5 min are referred to as the adjacent SAD values. In this example, four SAD values adjacent to the minimum value 5 min in the X and Y directions, i.e., Sx1, Sx2, Sy1 and Sy2 (reference numerals 153, 154, 155 and 156 in FIG. 24), are used as the adjacent SAD values.

Figure 25:
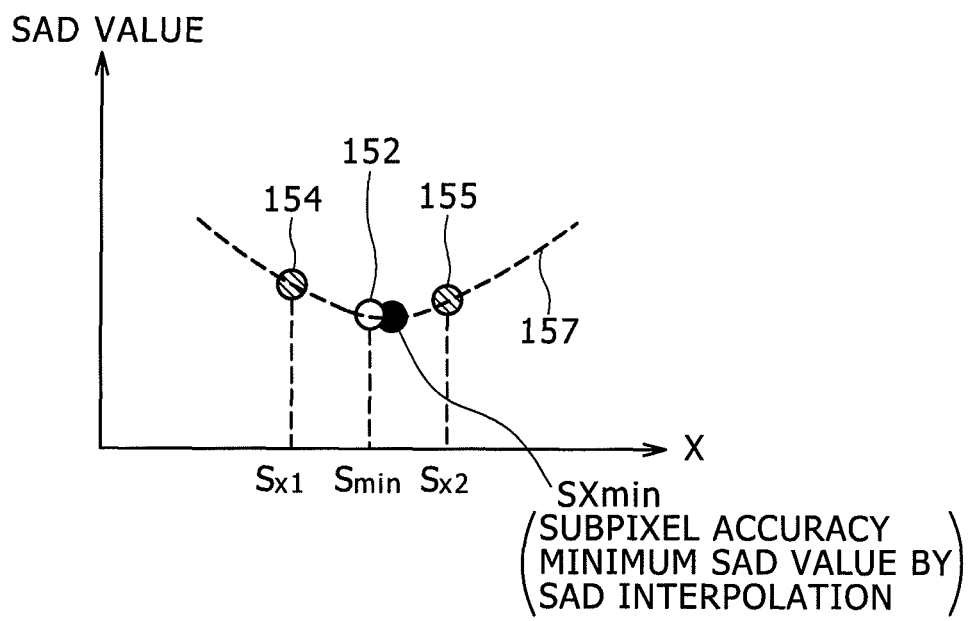
FIG. 25 is a diagram for describing the image processing device according to still another embodiment of the present invention.
Figure 29:
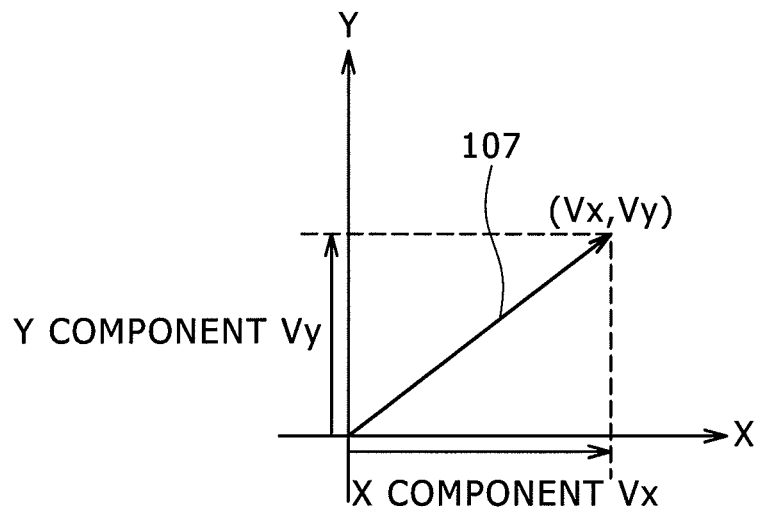
FIG. 29 is a diagram for describing the outline of the block matching process used for the embodiments of the image processing device according to the present invention.
Figure 30:
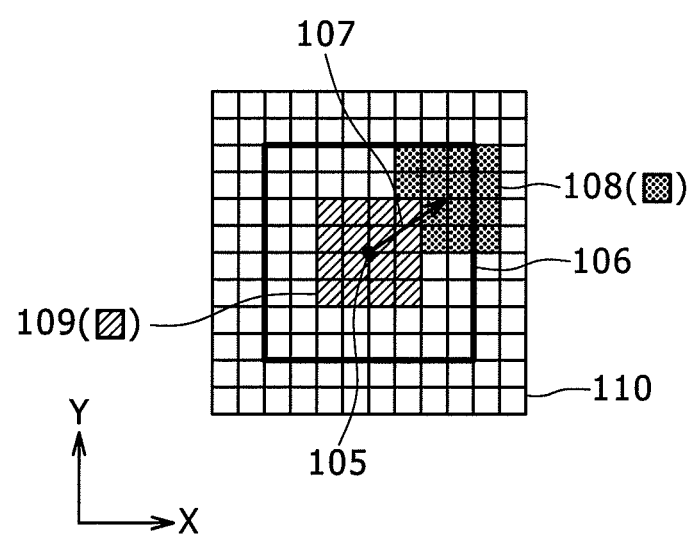
FIG. 30 is a diagram for describing the outline of the block matching process used for the embodiments of the image processing device according to the present invention.

First, a sub-pixel-accuracy calculation is performed for the X (horizontal) direction. As illustrated in FIG. 25, an approximate quadratic curve 157 is fitted using the minimum SAD value 5 min and two adjacent SAD values Sx1 and Sx2 that are adjacent in the X (horizontal) direction. The coordinate at which this quadratic curve 157 takes on its minimum value is an X coordinate Vx of the motion vector (high accuracy motion vector) with a sub-pixel-accuracy minimum SAD value SXmin. The quadratic approximation/interpolation equation for this relation is shown below as Equation 6.

$$SXmin = \frac{1}{2} \times (Sx2 - Sx1)/(Sx2 - 2Smin + Sx1) \quad \text{Equation 6}$$

The X coordinate of the minimum sub-pixel-accuracy SAD value SXmin in the SAD value table found by Equation 6 is the X coordinate Vx at which the sub-pixel-accuracy SAD value is minimum.

The division in Equation 6 can be achieved by repeating subtractions a plurality of times. The desired sub-pixel accuracy can be found by merely two subtractions if this accuracy is one quarter of the original pixel pitch accuracy. As a result, the circuit is small in scale and requires only short calculation time. This provides performance comparable to that achieved using cubic interpolation which is significantly more complex than quadratic approximation/interpolation.

Similarly, an approximate quadratic curve is fitted using the minimum SAD value 5 min and two adjacent SAD values Sy1 and Sy2 that are adjacent in the Y (vertical) direction. The Y coordinate at which this quadratic curve takes on its minimum value is a Y coordinate Vy of the motion vector with a sub-pixel-accuracy minimum SAD value SYmin. The quadratic approximation/interpolation equation for this relation is shown below as Equation 7.

$$SYmin = \frac{1}{2} \times (Sy2 - Sy1)/(Sy2 - 2Smin + Sy1) \quad \text{Equation 7}$$

As described above, a sub-pixel accuracy or high-accuracy motion vector (Vx,Vy) is found by performing quadratic approximation twice in the X and Y directions.

Although, in the above description, the minimum SAD value and its adjacent SAD values in the X (horizontal) and Y (vertical) directions were used, two or more adjacent SAD values may be used. Alternatively, an approximate quadratic curve may be fitted diagonally rather than in the X and Y directions. Still further, an approximate curve may be fitted not only in the X and Y directions but also in a diagonal direction.

It should be noted that, in the above embodiments, a motion vector was detected by the block matching method. However, a motion vector may be detected using the gradient method.

The gradient method estimates the speed based on spatial change in brightness in a frame and change in brightness over time between consecutive frames. This method is described in detail, for example, in Patent Document (U.S. Pat. No. 3,617,671). The technique proposed by Lucas & Kanade is a well known gradient method used for local areas. This technique finds a motion vector in such a manner as to minimize the square error of the gradient method on a block-by-block basis.

It should be noted that finding a motion vector relative to the block matching motion vector using the gradient method provides an accurate (sub-pixel accuracy) motion vector with a small number of calculations as described in the above Patent Document (U.S. Pat. No. 3,617,671).

In the above embodiments, the layered process initiated the process for the template blocks of the high resolution image frame after having found a motion vector for each of all the template blocks of the low resolution image frame.

However, the layered process may be performed for each of the template blocks. The process flow in this case is illustrated in the flowchart of FIG. 26.

That is, first, a low resolution template block is determined (step S901). Next, a low resolution motion vector is calculated and detected for the determined low resolution template block (step S902).

Next, a high resolution template block is determined (step S903). Next, it is determined whether or not to calculate a motion vector for the determined high resolution template block (step S904). This determination in step S904 is as described as the operation of the high resolution layer calculation determination section 14.

If it is determined in step S904 that a motion vector should be calculated, a motion vector is calculated in the high resolution layer by the high resolution motion vector calculation section 13, and the motion vector is output from the motion vector switching section 16 (step S905). The process flow in step S905 is identical in detail to that for the motion vector calculation enclosed by a dashed line in FIG. 8.

On the other hand, if it is determined in step S904 that a motion vector need not be calculated, the operation of the high resolution motion vector calculation section 13 is halted so that a motion vector is not calculated in the high resolution layer. Instead, the low resolution motion vector at the position associated with the high resolution template block is read from the low resolution motion vector buffer 10. Further, the motion vector, obtained by multiplying the low resolution motion vector from the scaling section 15 by the reciprocal of the image reduction ratio, is output from the motion vector switching section 16 (step S906).

After steps S905 and S906, it is determined whether or not the process steps have been completed for all the high resolution template blocks (step S907). If it is determined in step S907 that the process steps have yet to be completed for all the high resolution template blocks, control returns to step S901 where an unprocessed next high resolution template block is set, after which the process steps beyond step S901 are repeated. On the other hand, if it is determined in step S907 that the process steps have been completed for all the high resolution template blocks, this process routine is terminated.

In the above embodiments, the layered process was applied to two layers. However, the layered process is also applicable to three or more layers. In that case, it is needless to say that if it is determined that a motion vector need not be calculated in a middle layer, then a motion vector need not be calculated in the layers higher than the middle layer either. Further, in that case, the motion vector calculated in a layer is scaled according to the image size of the uppermost layer for use as the motion vector to be output.

For example, if it is determined, in the presence of four layers, that a motion vector should be detected in the first and second layers, but not in the third layer, then a motion vector is not detected in the fourth layer either. Instead, the combined motion vector calculated in the second layer is scaled according to the image size in the fourth layer and output.

The above embodiments were described referring to the case in which a motion vector is detected for moving image information. However, the present invention is also applicable for superposing a plurality of images to produce a still image in an imaging device. The present invention is also applicable for detecting a motion vector so as to correct handshake during still image capture.

The present application contains subject matter related to that disclosed in Japanese Priority Patent Application JP 2009-140813 filed in the Japan Patent Office on Jun. 12, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
a high resolution template frame buffer adapted to store image information of a high resolution template frame;
a high resolution reference frame buffer adapted to store image information of a high resolution reference frame;
a low resolution template frame buffer adapted to store image information of a low resolution template frame obtained by reducing the image of the high resolution template frame;
a low resolution reference frame buffer adapted to store image information of a low resolution reference frame obtained by reducing the image of the high resolution reference frame;
low resolution motion vector calculation means adapted to calculate a low resolution layer motion vector for each of blocks of a low resolution layer, each of the blocks is of a predetermined size and made up of a plurality of pixels, in the low resolution template and reference frames;
high resolution motion vector calculation means adapted to calculate a high resolution layer motion vector for each of blocks of a high resolution layer using the calculation result of the motion vector of the low resolution layer in the high resolution template and reference frames, the blocks of the high resolution layer being of a size associated with those of the low resolution layer; and
high resolution layer calculation determination means adapted to determine whether or not to calculate a motion vector for each of the blocks of the high resolution layer based on a comparison result indicating whether the low resolution layer motion vector is greater than a predetermined threshold, wherein if the high resolution layer calculation determination means determines that a motion vector should be calculated for the blocks of the high resolution layer, the high resolution motion vector calculation means is activated to calculate a motion vector in the high resolution layer, and if the high resolution layer calculation determination means determines that a motion vector need not be calculated for the blocks of the high resolution layer, the high resolution motion vector calculation means is not activated, and, instead, a motion vector is used as a substitute which is obtained by scaling the motion vector of the low resolution layer, calculated by the low resolution motion vector calculation means, according to the image size of the high resolution layer.

2. The image processing device of claim 1, wherein the high resolution layer calculation determination means determines whether or not to calculate a motion vector for each of the blocks of the high resolution layer by using information of the low resolution layer used to calculate a motion vector for the block of the low resolution template frame at the position associated with the block set in the high resolution template frame.

3. The image processing device of claim 2, wherein the high resolution layer calculation determination means determines whether or not to calculate a motion vector for each of the blocks of the high resolution layer based on the magnitude of the motion vector calculated for the block of the low resolution template frame at the position associated with the block set in the high resolution template frame.

4. The image processing device of claim 2, wherein the high resolution layer calculation determination means determines whether or not to calculate a motion vector for each of the blocks of the high resolution layer based on the degree of correlation between the block of the low resolution template frame at the position associated with the block set in the high resolution template frame and the block of the low resolution reference frame which references the motion vector calculated for the block of the low resolution template frame.

5. The image processing device of claim 2, wherein the high resolution layer calculation determination means determines whether or not to calculate a motion vector for each of the blocks of the high resolution layer based on the edge magnitude of image information in the block of the low resolution template frame at the position associated with the block set in the high resolution template frame.

6. The image processing device of claim 2, wherein the high resolution layer calculation determination means determines whether or not to calculate a motion vector for each of the blocks of the high resolution layer based on the degree of correlation between the block of the low resolution template frame at the position associated with the block set in the high resolution template frame and the block of the low resolution reference frame at the same position as the block of the low resolution template frame.

7. The image processing device of claim 1, wherein the high resolution layer calculation determination means determines whether or not to calculate a motion vector for each of the blocks of the high resolution layer using information of the high resolution layer used to calculate a motion vector for the block set in the high resolution template frame.

8. The image processing device of claim 7, wherein the high resolution layer calculation determination means determines whether or not to calculate a motion vector for each of the blocks of the high resolution layer based on the edge magnitude of image information in the block set in the high resolution template frame.

9. The image processing device of claim 7, wherein the high resolution layer calculation determination means determines whether or not to calculate a motion vector for each of the blocks of the high resolution layer based on the degree of correlation between the block set in the high resolution template frame and the block of the high resolution reference frame at the position associated with the block set in the high resolution template frame.

10. The image processing device of claim 1, wherein the high resolution layer calculation determination means determines whether or not to calculate a motion vector for each of the blocks of the high resolution layer based on the degree of correlation between the block set in the high resolution template frame and the block of the low resolution template frame at the position associated with the block set in the high resolution template frame.

11. The image processing device of claim 1, wherein the high resolution layer calculation determination means determines whether or not to calculate a motion vector for each of the blocks of the high resolution layer based on the degree of correlation between the block set in the high resolution template frame and the block of the high resolution reference frame at the position determined by the motion vector calculated for the block of the low resolution template frame at the position associated with the block set in the high resolution template frame.

12. An image processing method for use in an image processing device, the image processing device operable to calculate for an image a motion vector between template and reference frames for each of blocks, each of the blocks is of a predetermined size and made up of a plurality of pixels set in the template and reference frames, the image processing method comprising:

a first storage step in which first storage means stores image information of a high resolution template frame in a high resolution template frame buffer;

a second storage step in which second storage means stores image information of a high resolution reference frame in a high resolution reference frame buffer;

a first reduction step in which first reduction means generates image information of a low resolution template frame by reducing an image of the high resolution template frame;

a second reduction step in which second reduction means generates image information of a low resolution reference frame by reducing an image of the high resolution reference frame;

a third storage step in which third storage means stores image information of the low resolution template frame in a low resolution template frame buffer;

a fourth storage step in which fourth storage means stores image information of the low resolution reference frame in a low resolution reference frame buffer;

a low resolution motion vector calculation step in which low resolution motion vector calculation means calculates a motion vector of the low resolution layer between the template and reference frames for each of low resolution layer blocks, each of the blocks is of a predetermined size and made up of a plurality of pixels in the low resolution template and reference frames;

a high resolution motion vector calculation step in which high resolution motion vector calculation means calculates a high resolution layer motion vector for each of blocks of a high resolution layer in the high resolution template and reference frames using the calculation result of the motion vector of the low resolution layer, the blocks of the high resolution layer being of a size associated with those of the low resolution layer; and a determination step in which high resolution layer calculation determination means determines whether or not to calculate a motion vector for each of the blocks of the high resolution layer based on comparison result indicating whether the calculation result of the motion vector of the low resolution layer is greater than a predetermined threshold, wherein if it is determined in the determination step that a motion vector should be calculated for the blocks of the high resolution layer, the high resolution motion vector calculation step is performed to calculate a motion vector in the high resolution layer, and if it is determined in the determination step that a motion vector need not be calculated for the blocks of the high resolution layer, the high resolution motion vector calculation step is not performed, and, instead, a motion vector is used as a substitute which is obtained by scaling the motion vector of the low resolution layer, calculated in the low resolution motion vector calculation step, according to the image size of the high resolution layer.

* * * * *